(12) United States Patent
Vanaudenhove et al.

(10) Patent No.: US 11,383,191 B2
(45) Date of Patent: Jul. 12, 2022

(54) PRECLEANER FOR ENGINE AIR INTAKE AND METHODS

(71) Applicant: Donaldson Company, Inc., Minneapolis, MN (US)

(72) Inventors: William Vanaudenhove, Diest (BE); Paul Gossez, Hevillers (BE); Mathieu Jonckheere, Wezembeek-Oppem (BE); Massimo Movia, Enemonzo (IT); Steve Campbell, Lakeville, MN (US); Tim Wessels, Victoria, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 370 days.

(21) Appl. No.: 16/490,031

(22) PCT Filed: Feb. 28, 2018

(86) PCT No.: PCT/US2018/020267
§ 371 (c)(1),
(2) Date: Aug. 29, 2019

(87) PCT Pub. No.: WO2018/160725
PCT Pub. Date: Sep. 7, 2018

(65) Prior Publication Data
US 2020/0009487 A1    Jan. 9, 2020

Related U.S. Application Data

(60) Provisional application No. 62/466,592, filed on Mar. 3, 2017.

(51) Int. Cl.
*B01D 50/00*    (2022.01)
*B01D 45/16*    (2006.01)
(Continued)

(52) U.S. Cl.
CPC ......... *B01D 45/16* (2013.01); *F02M 35/0216* (2013.01); *F02M 35/0223* (2013.01);
(Continued)

(58) Field of Classification Search
CPC ............... B01D 45/16; F02M 35/0216; F02M 35/0223; F02M 35/0226; F02M 35/084;
(Continued)

(56) References Cited

U.S. PATENT DOCUMENTS 2,323,707 A  *  7/1943  Danz .................. B04C 3/04
                                                        55/347
2,461,677 A  *  2/1949  Burdock ............... B04C 5/28
                                                        55/348
(Continued)

FOREIGN PATENT DOCUMENTS

DE         10235761 A1    2/2004
DE      102015008525 A1   2/2016
(Continued)

OTHER PUBLICATIONS

International Search Report and Written Opinion for PCT/US2018/020267, dated Sep. 5, 2018.

*Primary Examiner* — Dung H Bui
(74) *Attorney, Agent, or Firm* — Merchant & Gould P.C.

(57) ABSTRACT

A precleaner for engine air filtration includes a housing, separator tubes for inducing cyclonic airflow, and channel arrangements in airflow communication with the separator tubes to channel airflow and particulates toward a dust outlet arrangement.

20 Claims, 20 Drawing Sheets

(51) Int. Cl.
*F02M 35/02* (2006.01)
*F02M 35/022* (2006.01)
*F02M 35/08* (2006.01)
*F02M 35/10* (2006.01)
*F02M 35/16* (2006.01)

(52) U.S. Cl.
CPC ....... *F02M 35/0226* (2013.01); *F02M 35/084* (2013.01); *F02M 35/10013* (2013.01); *F02M 35/164* (2013.01)

(58) Field of Classification Search
CPC ........... F02M 35/10013; F02M 35/164; F02M 35/10262; Y02T 10/12
See application file for complete search history.

(56) References Cited

U.S. PATENT DOCUMENTS

| | | | | |
|---|---|---|---|---|
| 2,662,610 | A | | 12/1953 | Heinrich |
| 3,421,296 | A | * | 1/1969 | Beurer, Sr. ............. F02B 61/04 55/306 |
| 3,469,566 | A | * | 9/1969 | Wilkinson ............. F02M 35/022 60/317 |
| 3,520,114 | A | * | 7/1970 | Gross ........................ B04C 3/00 55/347 |
| 4,050,913 | A | * | 9/1977 | Roach ................. B01D 50/002 96/381 |
| 4,158,449 | A | * | 6/1979 | Sun .......................... F02C 7/052 244/136 |
| 4,162,906 | A | * | 7/1979 | Sullivan .................... B04C 3/04 55/346 |
| 4,394,145 | A | | 7/1983 | Sundseth |
| 4,537,608 | A | * | 8/1985 | Koslow .................. B01D 46/48 55/337 |
| 4,746,340 | A | * | 5/1988 | Durre .................... B01D 45/12 55/347 |
| 4,767,425 | A | * | 8/1988 | Camplin ................ B01D 45/12 55/306 |
| 5,401,285 | A | * | 3/1995 | Gillingham ........... B01D 46/10 55/284 |
| 5,480,464 | A | * | 1/1996 | De Villiers .......... B01D 39/163 55/320 |
| 6,884,273 | B2 | * | 4/2005 | Kopec .................... B01D 45/12 210/512.2 |
| 6,932,849 | B2 | * | 8/2005 | Sheidler ................ B01D 45/16 55/347 |
| 7,879,123 | B2 | * | 2/2011 | Lundquist .............. B01D 45/16 55/456 |
| 7,938,872 | B2 | * | 5/2011 | Blossey .................... B04C 3/06 55/345 |
| 8,262,761 | B2 | * | 9/2012 | Babb ...................... B01D 45/16 55/346 |
| 9,370,783 | B2 | * | 6/2016 | Krishnamurthy ......... B04C 3/06 |
| D810,786 | S | * | 2/2018 | Chen ................................ D15/5 |
| 9,937,457 | B2 | * | 4/2018 | Wuebbeling ....... F02M 35/0223 |
| 10,688,504 | B2 | * | 6/2020 | Krishnamurthy ......... B04C 9/00 |
| 2004/0094114 | A1 | | 5/2004 | Riehmann et al. |
| 2013/0031878 | A1 | * | 2/2013 | Menssen ............ F02M 35/0223 55/345 |
| 2014/0102054 | A1 | | 4/2014 | Wuebbeling |
| 2014/0373490 | A1 | * | 12/2014 | Wuebbeling .......... B01D 45/08 55/345 |
| 2016/0047342 | A1 | | 2/2016 | Kraxner et al. |

FOREIGN PATENT DOCUMENTS

| | | |
|---|---|---|
| EP | 1287896 A1 | 3/2003 |
| WO | 2010/121991 A1 | 10/2010 |
| WO | 2016/082853 A1 | 6/2016 |
| WO | 2016/105560 A2 | 6/2016 |

* cited by examiner

PRECLEANER FOR ENGINE AIR INTAKE AND METHODS

This application is a U.S. National Stage application of PCT International Patent application No. PCT/US2018/020267, filed Feb. 28, 2018, which claims the benefit of priority to U.S. Provisional patent application Ser. No. 62/466,592, filed Mar. 3, 2017, which applications are incorporated herein by reference. To the extent appropriate, a claim of priority is made to each of the above disclosed applications.

TECHNICAL FIELD

This disclosure relates to air filtration systems that can be used with internal combustion engines. In particular, this disclosure relates to a precleaner for use with an air cleaner system and method of precleaning for internal combustion engines.

BACKGROUND

Vehicles can be used in conditions creating a lot of dust or other particulate. When the vehicles are used as over the highway trucks, there is less dust and particulate, but when they are used in off-road conditions or agricultural conditions, there can be a substantial amount of dust or other particulate in the air. In such situations, it can be helpful to have a precleaner upstream from the regular engine air filter.

Some precleaners do not do a sufficient job of removing enough particulate before the air enters the air cleaner. In those situations, the filter life of the normal air cleaner is short.

In some, e.g. agricultural, situations, it has been found desirable to remove at least 80% of the dust or particulate prior to the air entering the air cleaner. This disclosure concerns a solution to the problem of how to improve precleaner operation and remove at least 80% of the dust or other particulate in the air.

SUMMARY

A precleaner is provided which improves the prior art.

In one aspect, a precleaner is provided including a housing having a surrounding wall, an interior volume, an upstream flow face, and a dust outlet arrangement; a plurality of at least two separator tubes in the interior volume, in which each separator tube has a vane arrangement for inducing cyclonic air within the tube flowing from the upstream flow face, a pre-cleaned air outlet, and a particulate outlet; and one or more channel arrangements in airflow communication with at least some of the particulate outlets to channel airflow and particulates from the particulate outlets toward the dust outlet arrangement.

In example arrangements, at least a first separator tube has a first channel arrangement in air flow communication with the particulate outlet of the first separator tube, and the first channel arrangement comprises at least one channel wall.

In some embodiments, the first channel arrangement comprises at least a pair of channel walls.

In one or more example embodiments, at least one or more of the channel arrangements includes at least one channel wall.

In some embodiments, one or more of the channel arrangement includes one or more of the channel arrangements includes any of: at least one channel wall; a pair of channel walls; or more than a pair of channel walls shaped to channel air flow and particulates from the particulate outlets toward the dust outlet arrangement.

In some embodiments, each separator tube includes an inlet tube with a first end at the upstream flow face and an opposite second end, in which the second end defines an open slot forming the particulate outlet; the vane arrangement within the inlet tube is constructed and arranged to cause cyclonic airflow therewithin; and an outlet tube having an open entrance and an opposite open exit end, in which the open entrance of the outlet tube is within an interior of the inlet tube.

In some implementations, the open slot is within the channel walls of each channel arrangement.

In one or more embodiments, each pair of channel walls defines an inlet gap therebetween and proximal to a respective separator tube; and an outlet gap therebetween and distal from a respective separator tube, in which the outlet gap is smaller than the inlet gap.

Preferably, the outlet gap is no greater than 50% or 40% or 30% or 20% of an outer diameter of the separator tubes.

Preferably, the outlet gap is 4-11 mm.

In one or more arrangements, at least one channel wall in each pair includes a first wall section proximal a respective separator tube; and a second wall section angled at a non-zero angle relative to the first wall section.

In some embodiments, the first wall section is angled between 20-60° relative to a longitudinal plane extending perpendicular to a top and bottom of the housing, as the first wall section extends away from and toward the dust outlet arrangement of the housing.

In some embodiments, the second wall section is angled about 100°-160° (preferably 110°-150°) relative to the first wall section, as the second wall section extends away from the first wall section and toward the dust outlet arrangement of the housing.

Preferably, the second wall section is spaced laterally a first distance from a center of a respective separator tube, the first distance being greater than 75%, or 80% or 90%, or 100%, or 110%, or 120% of an outer diameter of the separator tube.

In some embodiments, the plurality of separator tubes includes at least two columns and two rows of separator tubes; each pair of channel walls defines an inlet gap therebetween and proximal to a respective separator tube, and an outlet gap therebetween and distal from a respective separator tube, the outlet gap being smaller than the inlet gap; and a smallest lateral distance between the second wall section and a sidewall of the housing is: (a width of the outlet gap X a total number of outlet gaps in a single column−1)/2.

In some arrangements, the plurality of separator tubes includes at least two columns and two rows of separator tubes.

In some embodiments, the plurality of separator tubes includes N columns and M rows of separator tubes, in which N can be at least one, and M can be at least one, with N+M>2. In use, the columns can preferably be directed substantially along the directing of the gravity force.

In some embodiments, the plurality of separator tubes includes at least two columns and 3-10 rows of separator tubes.

In one or more embodiments, the dust outlet arrangement includes first and second spaced dust evacuation valves.

In one or more embodiments, the plurality of separator tubes includes a first column of a plurality of separator tubes and a second column of a plurality of separator tubes; the first column of separator tubes induces cyclonic airflow in one of a clockwise or counterclockwise direction; and the second column of separator tubes induces cyclonic airflow in the other of clockwise or counterclockwise direction.

In some embodiments, the dust outlet arrangement includes a first dust evacuation valve in airflow communication with channel arrangements corresponding to the first column of separator tubes; and the dust outlet arrangement includes a second dust evacuation valve in airflow communication with channel arrangements corresponding to the second column of separator tubes.

In some example arrangements, the plurality of separator tubes includes at least a first separator tube and a second separator tube aligned in a row or column; and the one or more channel arrangements includes channel arrangements in air flow communication with the particulate outlets of the first separator tube and second separator tube to eject air flow and particulates in a same direction and toward the dust outlet arrangement. The first separator tube can, for example, induce cyclonic air flow in one of a clockwise or counterclockwise direction, and the second separator tube can induce cyclonic air flow in the other of clockwise or counterclockwise direction.

In another aspect, an air cleaner system is provided. The air cleaner system includes a precleaner as variously characterized herein; and an air filter arrangement downstream of and in airflow communication with the precleaner, the air filter arrangement taking in air from the precleaned air outlets of the separator tubes.

In another aspect, a method of precleaning air is provided. The method includes directing air into an upstream flow face of a housing having a surrounding wall, an interior volume, and a dust outlet arrangement; directing the air into a plurality of separator tubes in the interior volume having vane arrangements to induce cyclonic air within the tubes and cause particulates to exit the tubes through particulate outlets in the tubes; and directing particulates from the particulate outlets into channel arrangements and toward the dust outlet arrangement.

A variety of examples of desirable product features or methods are set forth in part in the description that follows, and in part, will be apparent from the description, or may be learned by practicing various aspects of the disclosure. The aspects of the disclosure may relate to individual features as well as combinations of features. It is to be understood that both the forgoing general description and the following detailed description are explanatory only, and are not restrictive of the claimed invention.

DETAILED DESCRIPTION

A. Overview of System

Figure 1:
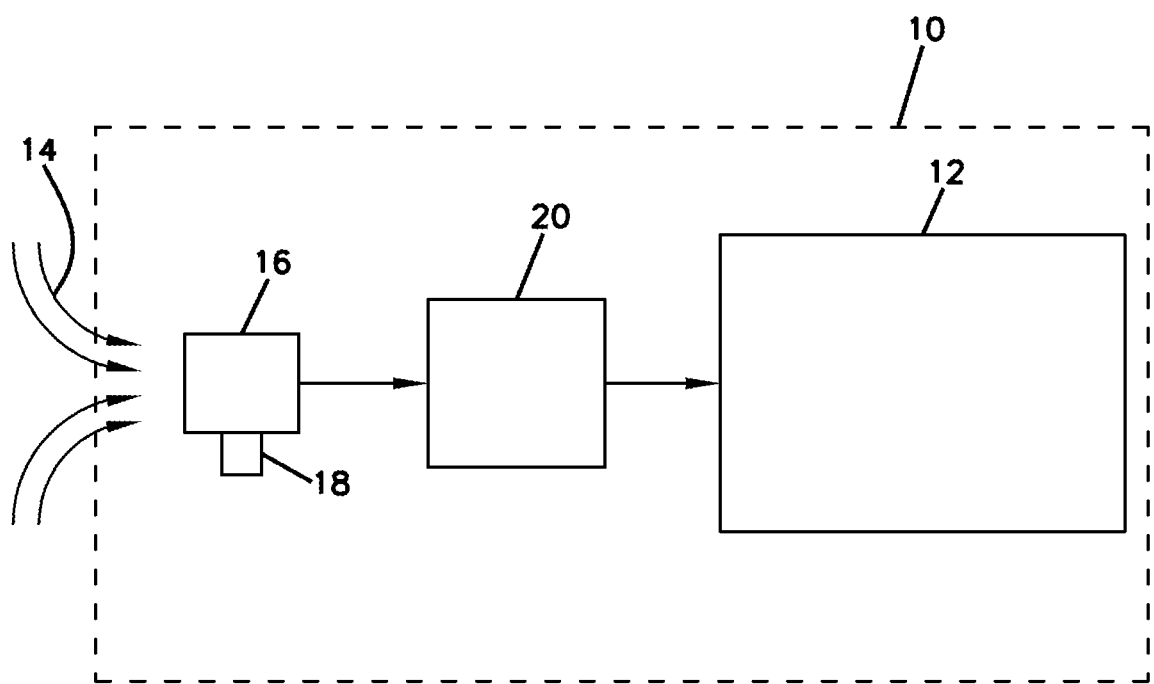
FIG. 1 is a schematic view of an engine system utilizing a precleaner according to principles of this disclosure.

FIG. 1 illustrates one system in which precleaners and air cleaners according to principles of this disclosure can be used. In FIG. 1, equipment 10, such as a vehicle having an engine with a defined rated airflow demand is shown schematically. For example, the engine 12 can have an airflow demand of at least 500 cfm, and typically 700-1200 cfm. The equipment 10 can include a variety of vehicles such as an over the highway truck, an off-road vehicle, a tractor, or a marine application.

The engine 12 powers the equipment 10 through use of an air and fuel mixture. In FIG. 1, airflow is shown at 14 being drawn into a precleaner 16. The precleaner 16 will remove at least some dust and other particulate from the air 14. Preferably, the precleaner 16 removes at least 80% of the dust and other particulate from the air 14. The precleaner 16 can include an evacuation valve arrangement 18 to expel the dust and other particulate removed.

The precleaned air then is drawn into an air cleaner 20. The air cleaner 20 can have filter constructions to remove the remaining dust or particulate from the air. From the air cleaner 20, the cleaned air is then drawn into the internal combustion engine 12, where it is used with fuel to power the equipment 10.

Figure 2:
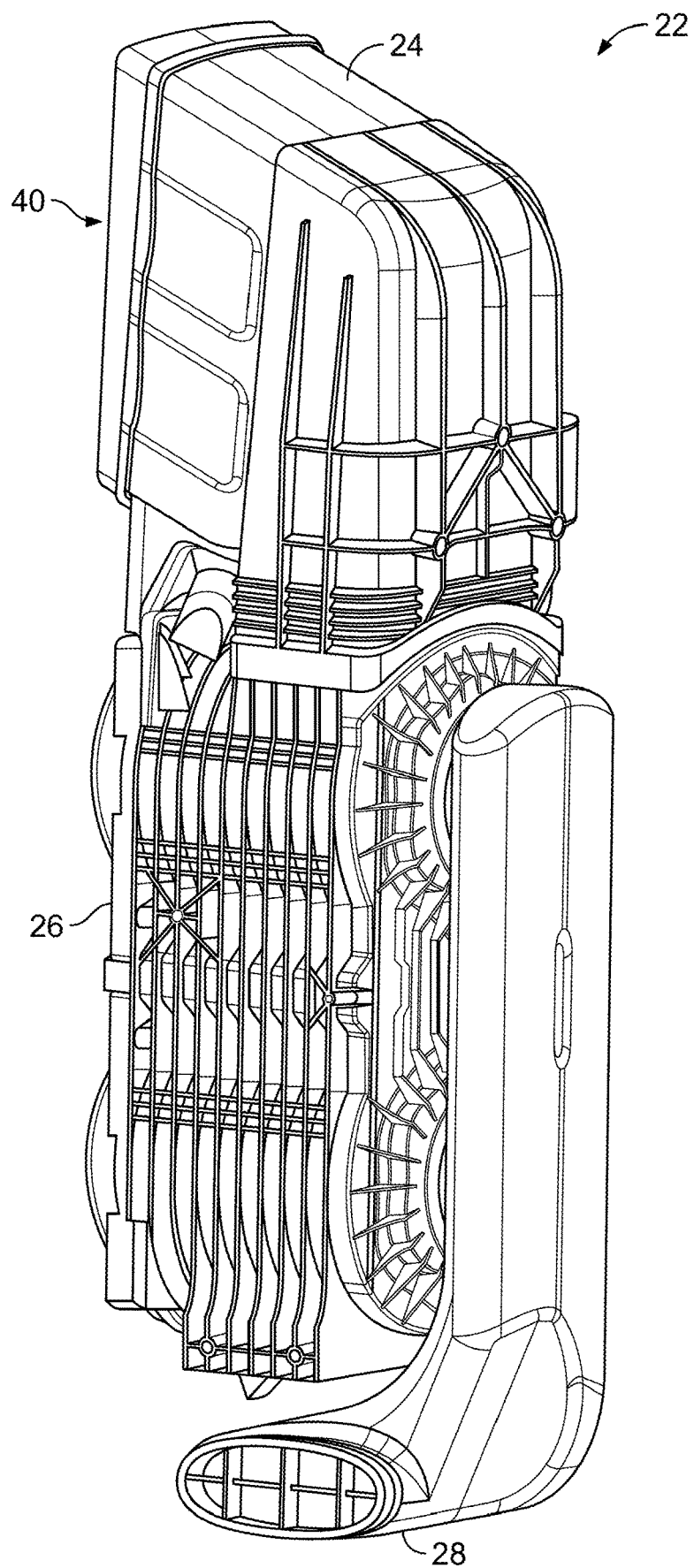
FIG. 2 is a perspective view of one embodiment of an air cleaner system utilizing a precleaner made in accordance with principles of this disclosure.

FIG. 2 illustrates an example air cleaner system 22 that can be used to power equipment 10. The system 22 includes an example embodiment of precleaner 16, depicted as precleaner 24 and an example embodiment of air cleaner 20, depicted as air filter arrangement 26. The precleaner 24 takes in airflow and removes at least some of the dust and particulate. The air filter arrangement 26 is downstream of and in airflow communication with the precleaner 24. The air filter arrangement 26 further cleans the air, and then the cleaned air is directed to the engine 12 through an air cleaner outlet 28.

B. Example Precleaner, FIGS. 3-10

In existing precleaners that use a number of separator tubes or vortex separators, there can be a problem of dust that is separated from one tube being drawn into an adjacent separator tube. Thus, it was determined that if the separator tubes could be isolated better from each other, this would diminish the amount of dust from one separator tube being drawn into another separator tube. The precleaner 16 according to this disclosure helps to solve this problem and other problems by diminishing the amount of dust from one separator tube flowing into another. This results in advantages including having improved capacity to remove dust and particulate, including being able to remove at least 80% of dust or other particulate from the air before it enters into the air filter arrangement 26.

Figure 3:
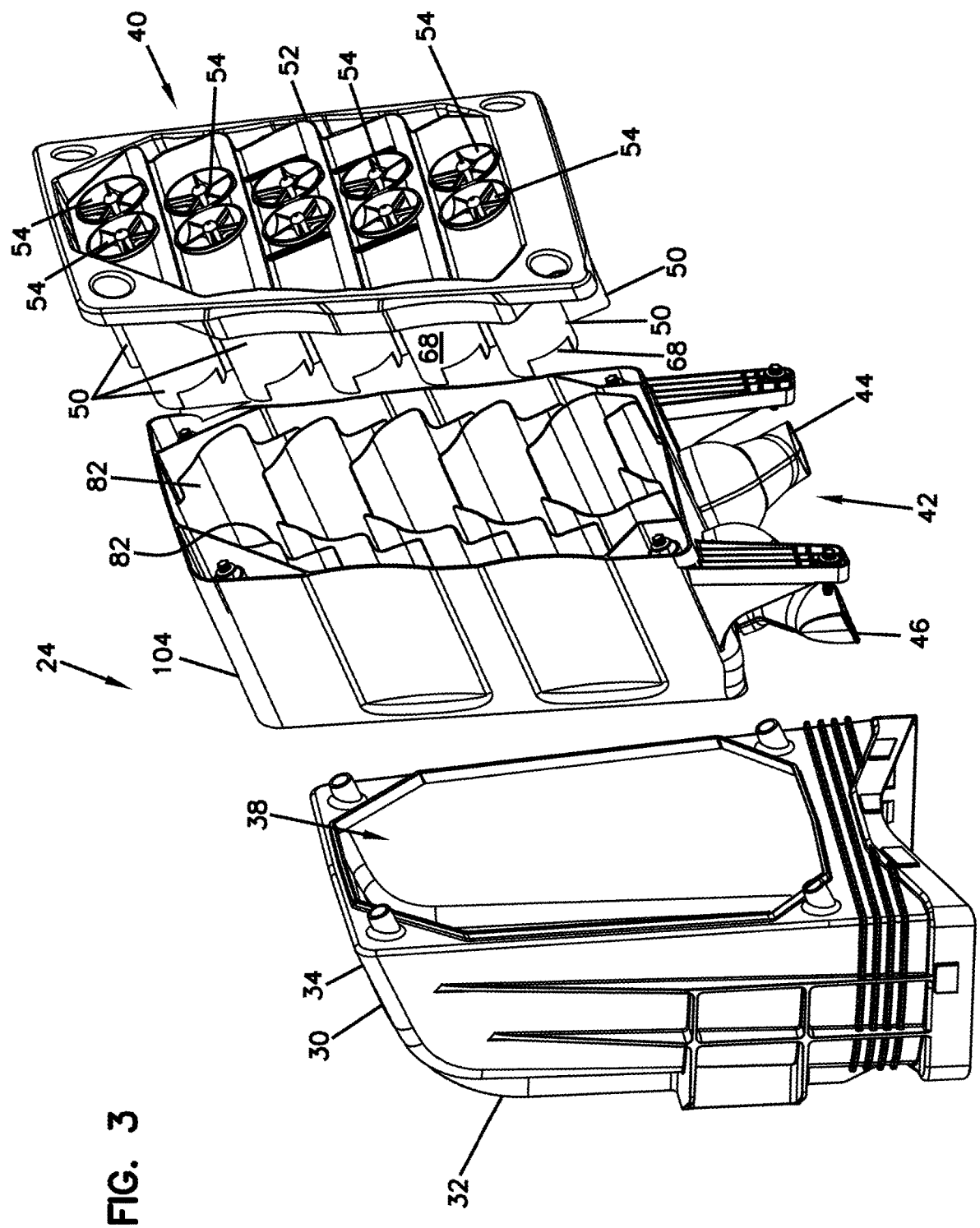
FIG. 3 is an exploded perspective view of the precleaner of FIG. 2.
Figure 4:
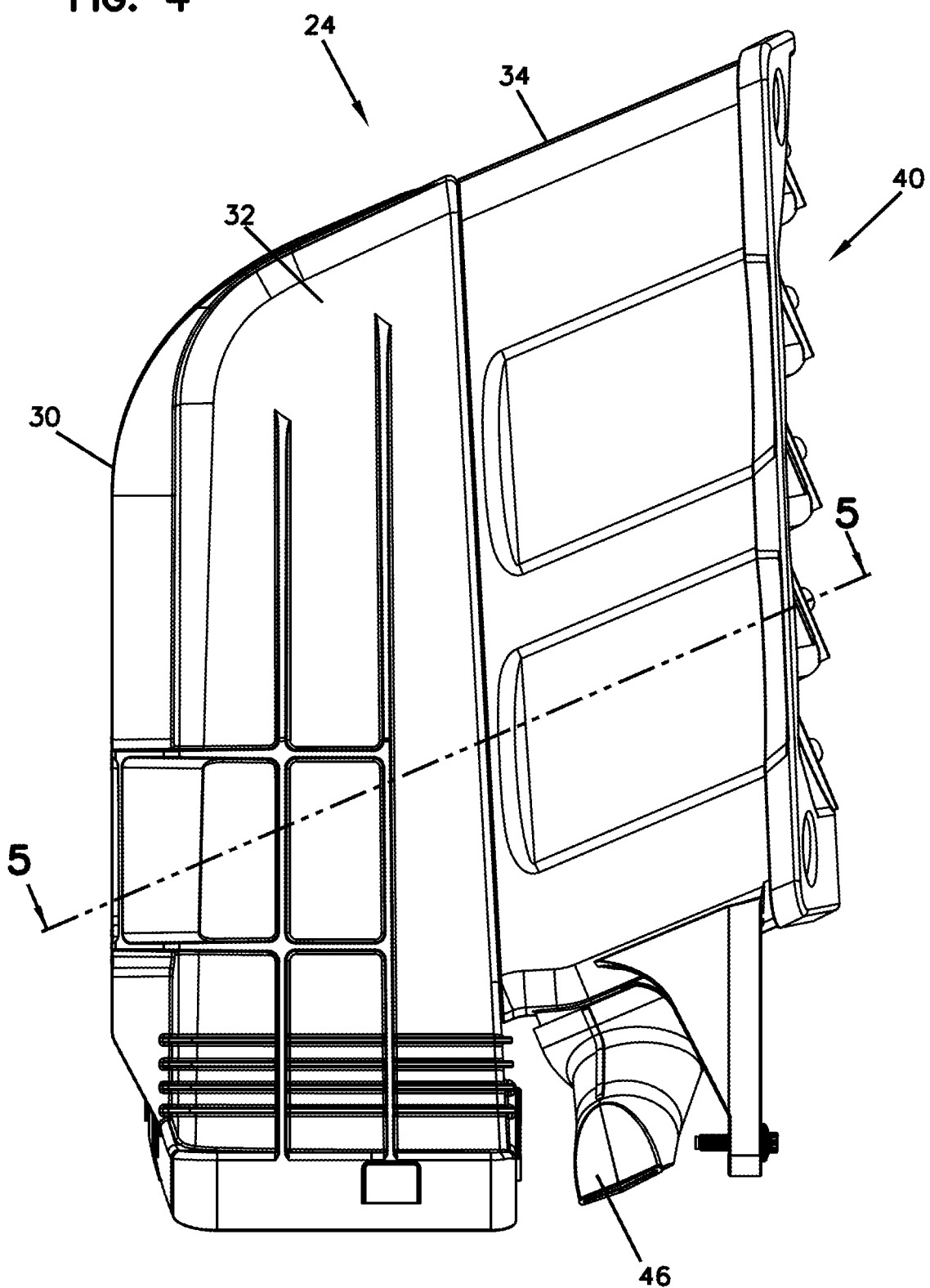
FIG. 4 is a side view of the assembled precleaner of FIG. 3.

In FIG. 3 is an exploded perspective view of an example embodiment of the precleaner 24, constructed in accordance with principles of this disclosure. The precleaner 24 includes a housing 30. The housing 30 includes a surrounding wall 32. The surrounding wall 32 can include, when operably mounted, a top wall 34 and an opposite bottom wall 36. The housing 30 defines an interior volume 38, an upstream flow face 40, and a dust outlet arrangement 42. The dust outlet arrangement 42 can include at least one, and in this embodiment, first and second spaced dust evacuation valves 44, 46 in airflow communication with internal components of the precleaner 24.

The upstream flow face 40 will be the portion of the precleaner 24 that is oriented to draw in airflow. It can have an optional screen upstream of it in order to prevent the intake of large particulate, such as leaves, butterflies, cigarettes, and other large debris.

The precleaner 24 includes a plurality of separator tubes 50 held within the interior volume 38 of the housing 30. While there can be many different embodiments, in the example embodiment shown, the separator tubes 50 can be mounted in a separator tube housing 52. The separator tube housing 52 fits in and is received by the precleaner housing 30. Each separator tube 50 has a vane arrangement 54 for inducing cyclonic air flow within the tube 50 flowing into the upstream flow face 40. The vane arrangements 54 can be seen as forming the upstream flow face 40.

Figure 5:
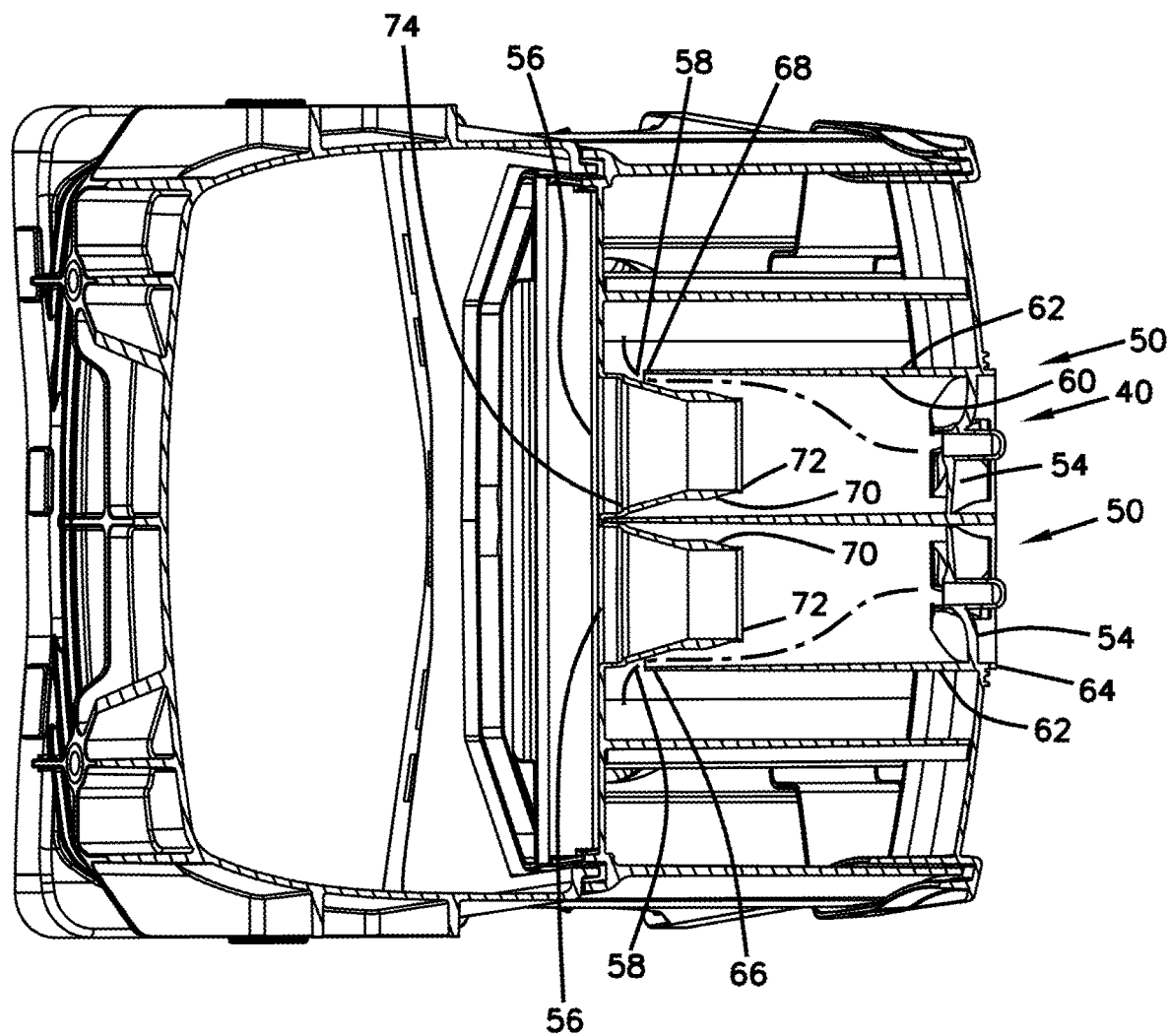
FIG. 5 is a cross-sectional view of the precleaner of FIG. 4, the cross-section being taken along the line 5-5 of FIG. 4.
Figure 6:
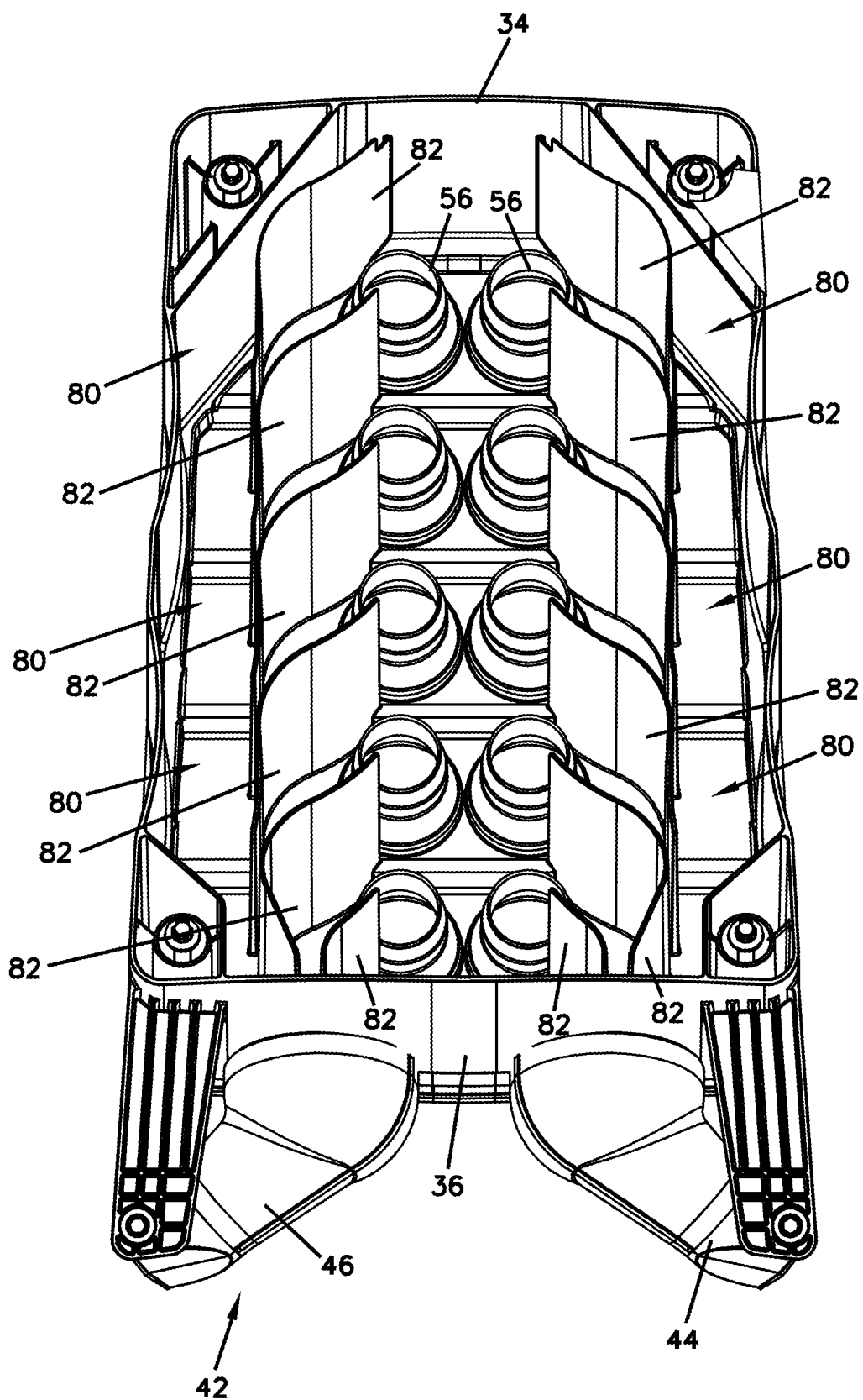
FIG. 6 is a perspective view of a rear portion of the precleaner made in accordance with principles of this disclosure, with the cover removed to show internal components.

In reference now to FIG. 5, each separator tube 50 further includes a precleaned air outlet 56 and a particulate outlet 58. In general, air is drawn in through the upstream flow face 40 and the vane arrangements 54 induce a vortex or cyclonic airflow which produces centrifugal forces, causing at least some debris to move toward the inner surface 60 of the separator tube 50. The air is allowed to flow through the precleaner air outlet 56, while the dust or debris exits through the particulate outlet 58. From there, the debris will fall by gravity into the dust outlet arrangement 42 and be evacuated through one of the dust evacuation valves 44, 46.

Still in reference to FIG. 5, each separator tube 50 includes an inlet tube 62 with a first end 64 at the upstream flow face 40 and an opposite second end 66. The second end 66 defines an open slot 68 (see also FIGS. 3 and 9) forming the particulate outlet 58. The vane arrangement 54 is within the inlet tube 62 and is constructed and arranged to cause cyclonic airflow therewithin.

Still in reference to FIG. 5, each separator tube 50 further includes an outlet tube 70. The outlet tube 70 has an open entrance end 72 and an opposite open exit end 74. The open entrance end 72 is within an interior of the inlet tube 62. The exit end 74, in this embodiment, also defines the precleaned air outlet 56 of the separator tube 50.

A variety of embodiments are possible. Typically, the plurality of separator tubes 50 includes N columns and M rows of separator tubes, in which N can be at least one, and M can be at least one, with N+M>2. In use, the columns can preferably be directed substantially along the direction of the gravity force.

Figure 8:
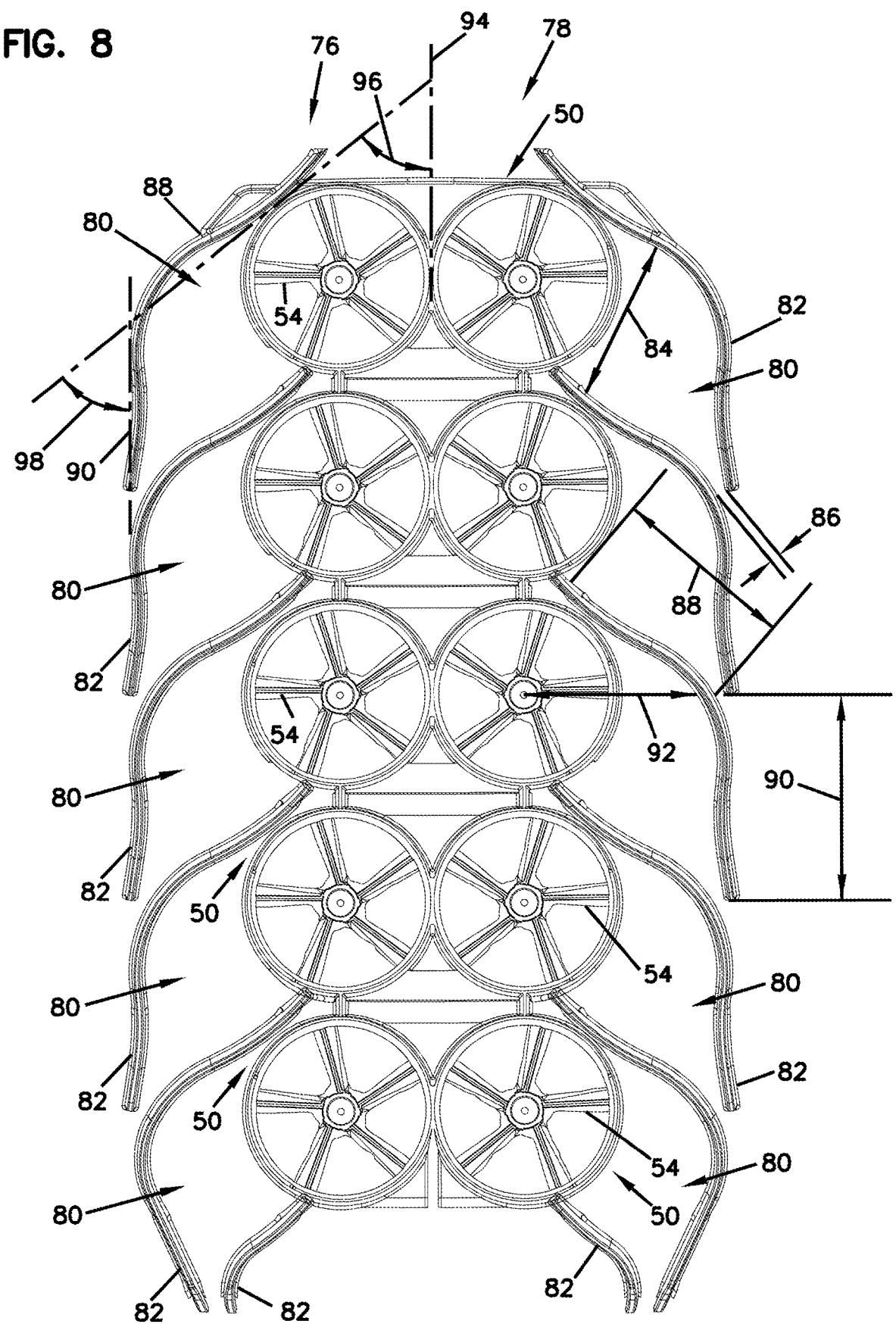
FIG. 8 is a plan view from an upstream side of the precleaner of FIGS. 1-7 and showing only the separator tubes and channel arrangements.
Figure 9:
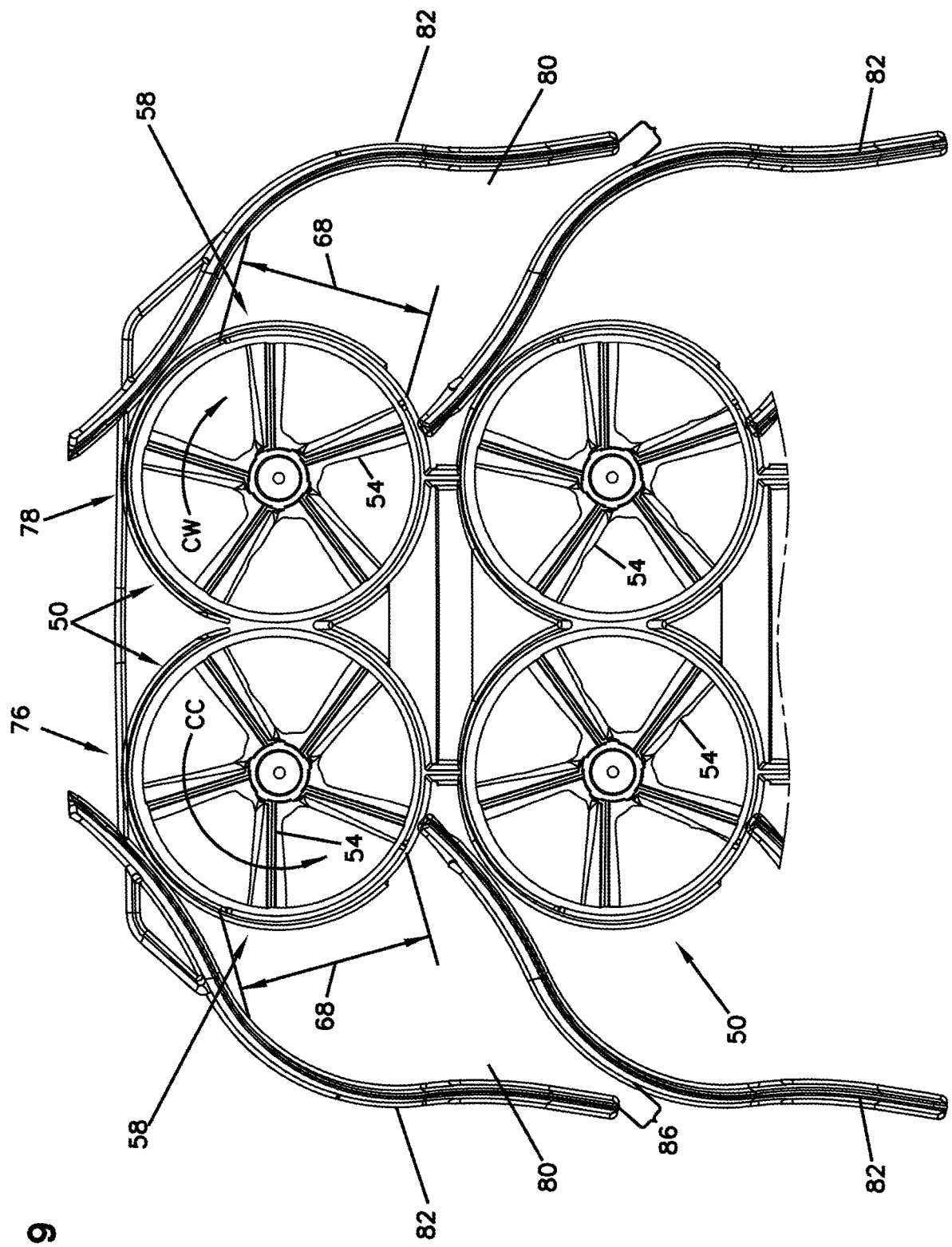
FIG. 9 is an enlarged view of a portion of FIG. 8.

In many arrangements, the plurality of separator tubes 50 includes at least two columns and two rows of separator tubes 50. In the embodiment of FIG. 8, which shows a view from the upstream flow face 40 of the separator tubes 50 but without the remaining housing, there is at least a first column 76 and a second column 78 of separator tubes 50. Preferably, there can be 3-10 rows of separator tubes 50, and in the example arrangement shown in FIG. 8, there are five rows of separator tubes 50. It is advantageous if the separator tubes 50 in the first column 76 induce a cyclonic airflow that is opposite of the airflow direction in the second column 78. In the examples shown in FIG. 8, the vane arrangements 54 in column 76 induce cyclonic airflow in a counterclockwise direction CC (FIG. 9), while the vane arrangements 54 in the second column 78 induce cyclonic airflow in a clockwise direction CW (FIG. 9). This helps to direct the particulate away from the separator tube 50 in the adjacent column and to the dust outlet arrangement 42.

In accordance with principles of this disclosure, the precleaner 24 further includes one or more channel arrangements 80 (FIGS. 7-9) in airflow communication with at least some of the particulate outlets 58 to channel airflow and particulates from the particulate outlets 58 toward the dust outlet arrangement 42.

The channel arrangements 80 are structure that are provided in addition to the usual, typical housing 30. That is, the channel arrangements 80 are not part of the portion of the housing which defines the interior volume, nor are they part of the separator tubes 50, although in some embodiments, they can be close to, or attached, to the separator tubes 50 at their inner end. In some embodiments, the channel arrangements 80 do not provide added strength to the housing.

Many embodiments are possible. In the example embodiment illustrated, one or more of the channel arrangements 80 includes at least one channel wall, and as illustrated, a pair of channel walls 82 on opposite sides of the particulate outlets 58. The channel walls 82 can be shaped in many different shapes and generally should channel or direct the particulate matter from the particulate outlet 58 of each separator tube 50 in a direction away from other separator tubes 50 and toward the dust outlet arrangement 42.

Figure 10:
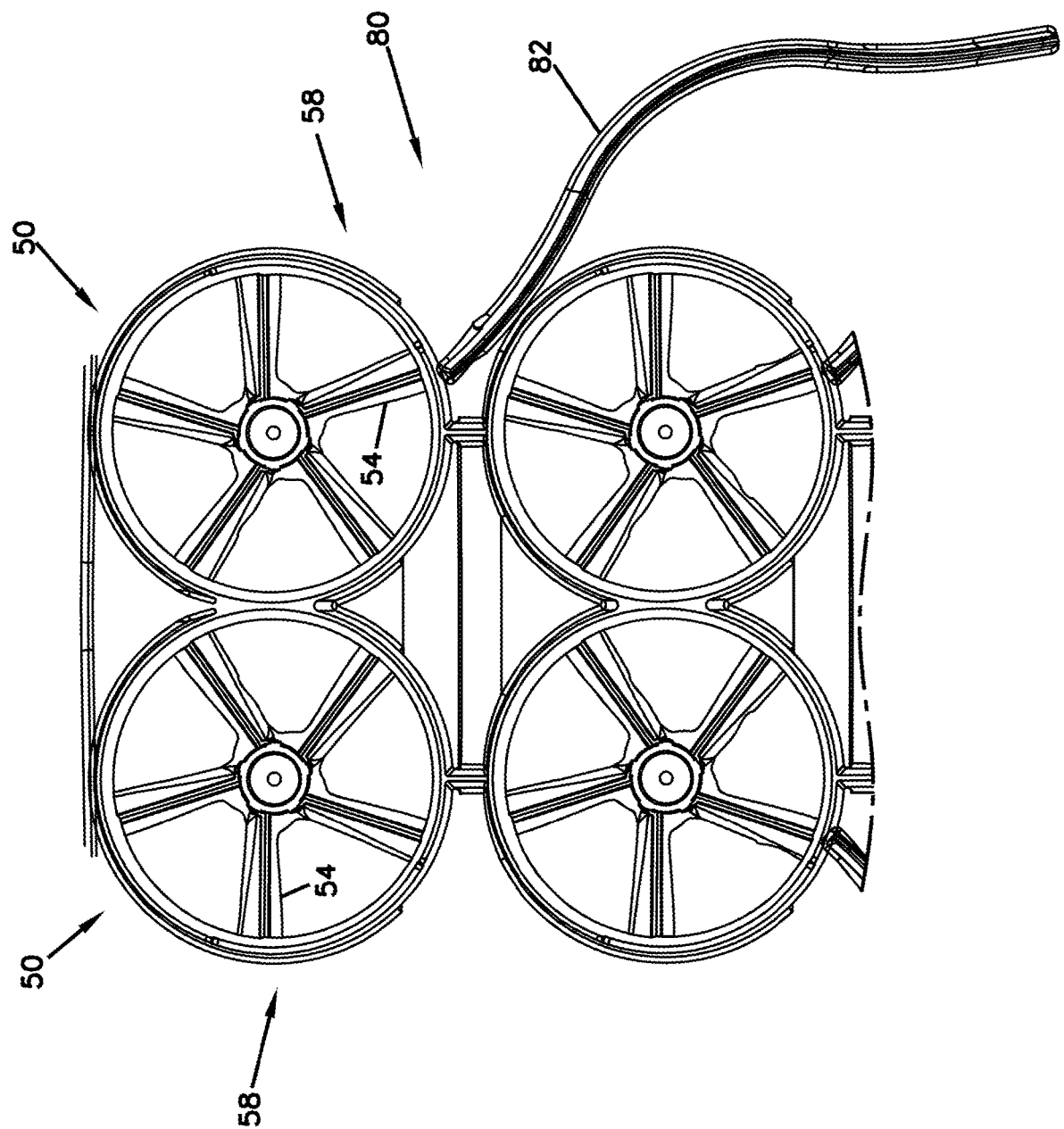
FIG. 10 is a plan view from an upstream side of the precleaner, similar to FIG. 8, and showing an alternative embodiment.

The channel arrangements 80 can vary, and include only a single channel wall 82 (FIG. 10). There may be variations in which the channel arrangements 80 including two, three, or four channel walls 82 channel or direct the particulate matter from the particulate outlet 58 of each separator tube 50 in a direction away from other separator tubes 50 and toward the dust outlet arrangement 42. It can be sufficient to have only two separator tubes 50 and a single channel wall 82 to both: (i) result in some efficiency increase; and (ii) solve the problem of dust ejecting from one tube 50 into an adjacent tube 50.

Advantages are achieved when the open slot 68 is oriented to be between the channel walls 82 of each channel arrangement 80. This can be seen in FIG. 9. When the dust or particulate is driven toward the inner surface 60 (FIG. 5) of the inlet tube 62, it will eventually go through the slot 68 and then follow between the walls 82 of the channel arrangement 80.

In reference now to FIGS. 8 and 9, the channel walls 82 may have many different shapes. In general, each pair of channel walls 82 defines an inlet gap 84 therebetween and proximal to one of the respective separator tubes 50. Each pair of channel walls 82 further defines an outlet gap 86 therebetween and distal from the respective separator tube 50. The outlet gap 86 is smaller than the inlet gap 84. In many arrangements, the outlet gap 86 is no greater than 50%, or 40%, or 30%, or 20%, or 10% of an outer diameter of the separator tubes 50. The outlet gap 86 is often not greater than 60%, or 50%, or 40%, or 30%, or 20%, or 10% of the distance of the inlet gap 84.

While this embodiment shows the diameters of the separator tubes 50 being equal, in other embodiments, the separator tubes 50 may have different diameters.

While many arrangements are possible, it has been found to lead to advantage when the outlet gap 86 is about 4-11 mm, for example, about 6 mm.

The shape of the channel walls 82 may be a variety of shapes. In this example, and is shown in FIG. 8, each of the channel walls 82 includes at least a first wall section 88 proximal to a respective one of the separator tubes 50 and a second wall section 90 angled at a non-zero angle relative to the first wall section 88. In addition to the angled shape between first wall section 88 and second wall section 90, the overall shape of the channel walls can be curved. For example, between the first wall section 88 and second wall section 90, there can be one or more wall sections in between, to result in a curved shape.

Advantages result if the second wall section 90 is spaced a predetermined distance from the center of the adjacent separator tube 50, which is sufficient order to avoid having particulate material bounced back and be drawn into one of the outlet tubes 50. It has been found advantageous if the second wall section 90 is spaced laterally the predetermined distance, depicted in FIG. 8 as first distance 92 from the center of the separator tube 50. Here, this first distance 92 is greater than the outer diameter of the separator tube 50. In many instances, the first distance 92 the first distance is greater than 75%, or 80% or 90%, or 100%, or 110%, or 120% of an outer diameter of the separator tube 50. This spacing between the second wall section 90 and the adjacent separator tube 50 helps to prevent debris and particulate from bouncing off of the second wall section 90 and being redirected into the separator tube 50.

Advantages result when the first wall section 88 is angled in a downward direction as it extends away from and toward the dust outlet arrangement 42 of the housing 30. In FIG. 8, a longitudinal plane 94 is shown schematically, as it would extend through the housing 30 and generally perpendicular to the top 34 and bottom 36 of the housing 30. The first wall section extends at an angle 96 relative to the longitudinal plane 94. The angle 96 can be between 20-60° for advantages to result. This helps to direct the particulate matter in a downward direction from the particulate outlet 58, into the channel arrangement 80, and through the outlet gap 86.

In this embodiment, the second wall section 90 is illustrated as being angled at a non-zero angle relative to the first wall section 88. The angle 98 can be in a range between 100-160, preferably between 110-150°. It should be understood that many different shapes for the channel walls 82 are possible, and the arrangement shown is just one example.

In the FIG. 8 embodiment, there are channel walls 82 that are common to two separator tubes 50, in which one individual channel walls 82 is between two vertically aligned separator tubes 50 within a column. In other embodiments, one or more separator tubes 50 can have two independent channel walls 82, i.e. not share a common channel wall 82.

Figure 7:
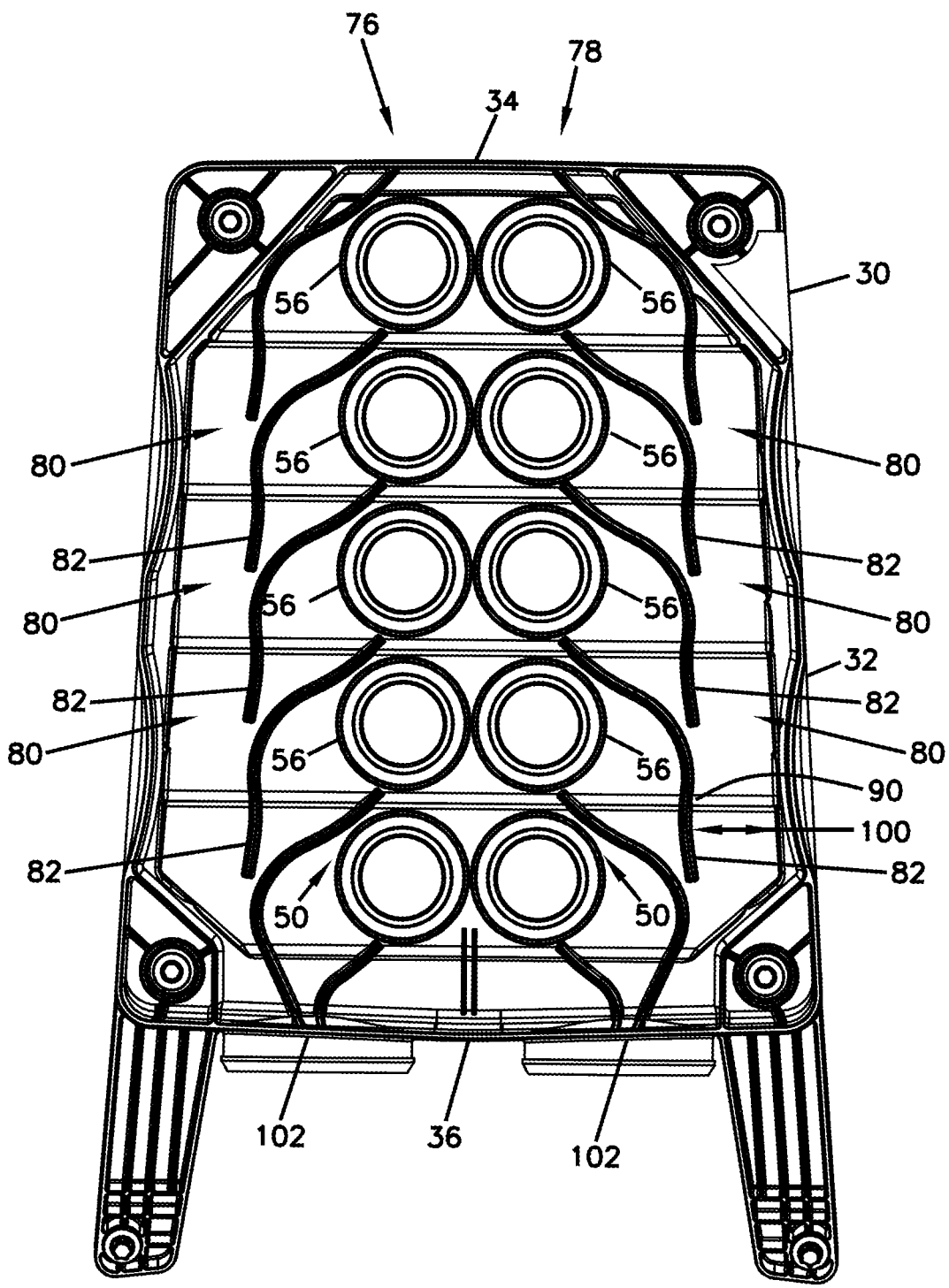
FIG. 7 is a plan view of the precleaner of FIG. 6.

Attention is directed to FIG. 7. In FIG. 7, a distance 100 is shown as representing a lateral distance between the second wall section 90 and the side wall 32 of the housing 30. According to a preferred embodiment, the smallest lateral distance 100 between the second wall section 90 and the side wall 32 can be calculated by the following formula: [a width of the outlet gap X (a total number of outlet gaps in a single column−1)]/2. That is, multiply the width of the outlet gap 86 times (a total number of outlet gaps in a single one of the columns 76, 78 and subtracting 1) and then dividing that product by two. This results in the smallest lateral distance 100. The reason that the number one is subtracted from the total number of outlet gaps in a single one of the columns is that it corresponds to the final outlet gap 102 that leads directly into one of the dust evacuation valves 44, 46. In one example, when the outlet gap 86 is about 6 mm, and in FIG. 7, the total number of outlet gaps in a single column minus one is 4, the smallest lateral distance 100 is 12 mm.

In FIG. 3, it can be seen how the channel walls 82 are held in the housing 30 by a channel housing 104. The channel housing 104 is operably received by and fits in with the housing 30 to form the overall housing for the precleaner 24. The channel housing 104 also holds the dust outlet arrangement 42 in the form of the two spaced dust evacuation valves 44, 46. In FIG. 3, it can be seen how the housing 52 for the separator tubes 50 fits within and is held by the channel housing 104, and that subassembly of the channel housing 104 and separator tube assembly 50 fits into the overall housing 30.

C. Variations FIGS. 11-21

Figure 11:
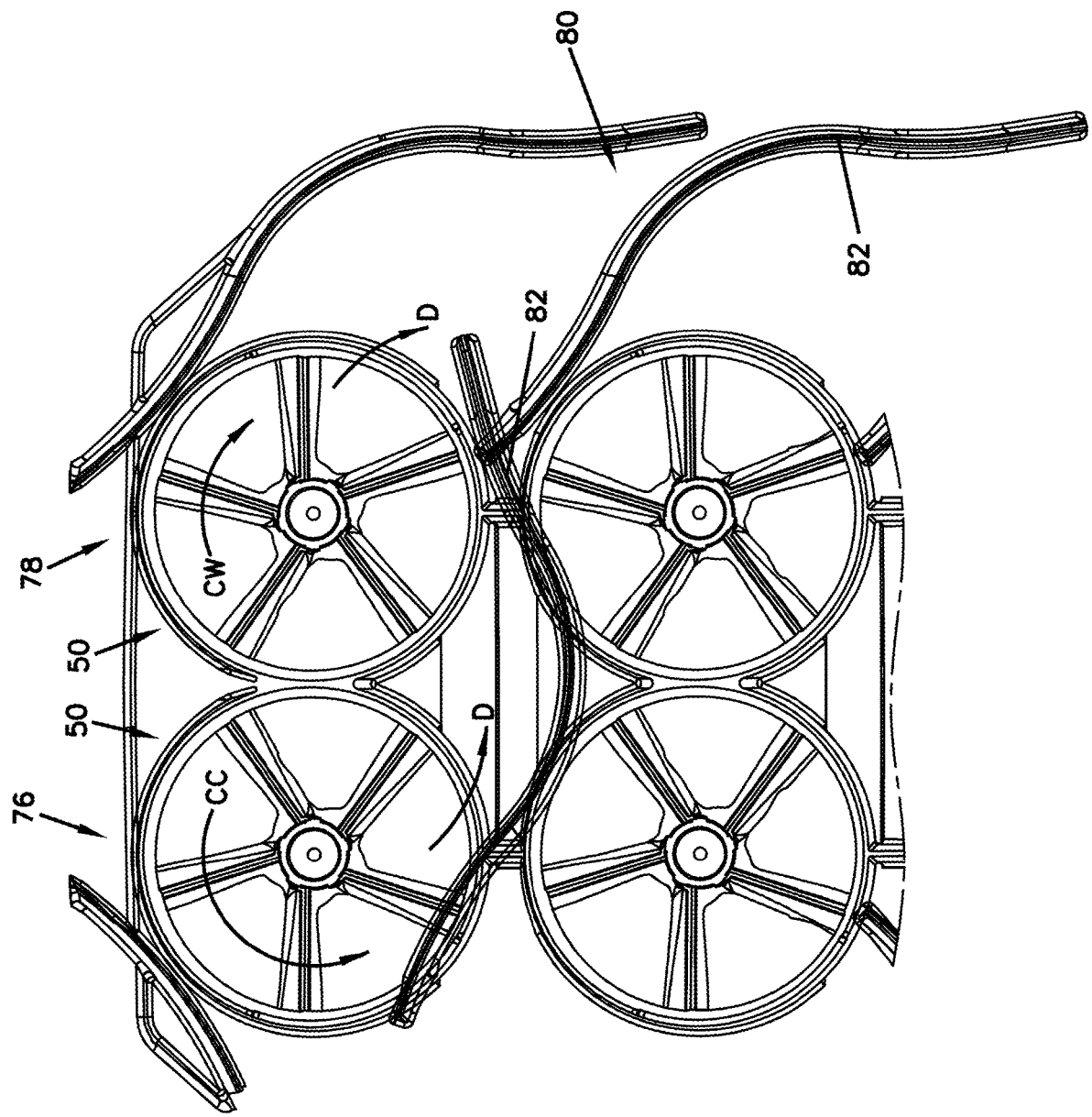
FIG. 11 is a plan view from an upstream side of the precleaner, similar to FIG. 8, and showing another alternative embodiment.

An alternate arrangement is illustrated in FIG. 11. In FIG. 11, as with the embodiment of FIG. 9, the separator tubes 50 in the first column 76 induce a cyclonic airflow in a counterclockwise direction CC, while the vane arrangements 54 in the second column 78 induce cyclonic airflow in a clockwise direction CW. But, in the FIG. 11 embodiment, the tubes 50 are ejecting dust (airflow and particulates) in the same general direction toward the same side of the side wall of the precleaner (see arrows D in FIG. 11). Two channel walls 82 are illustrated guiding the dust of the two tubes 50 in toward the same side of the precleaner and toward the dust outlet arrangement 42.

Figure 12:
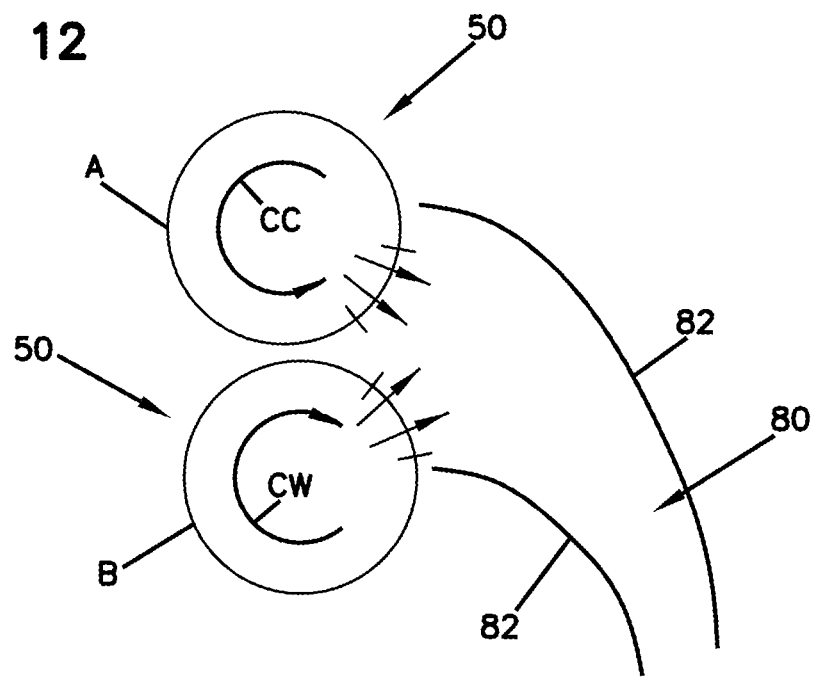
FIG. 12 is a schematic plan view of another embodiment, showing separator tubes and channel arrangements.

FIG. 12 is a schematic view of another embodiment. In the FIG. 12 embodiment, a cyclonic airflow is induced in a counterclockwise direction CC in tube A, while a cyclonic airflow is induced in a clockwise direction CW in tube B. Both tubes 50 are ejecting dust (airflow and particulates) in the same general direction toward the same side of the side wall of the precleaner. Two channel walls 82 are illustrated guiding the dust of the two tubes 50 in toward the same side of the precleaner and into the channel arrangement 80 toward the dust outlet arrangement 42.

Figure 13:
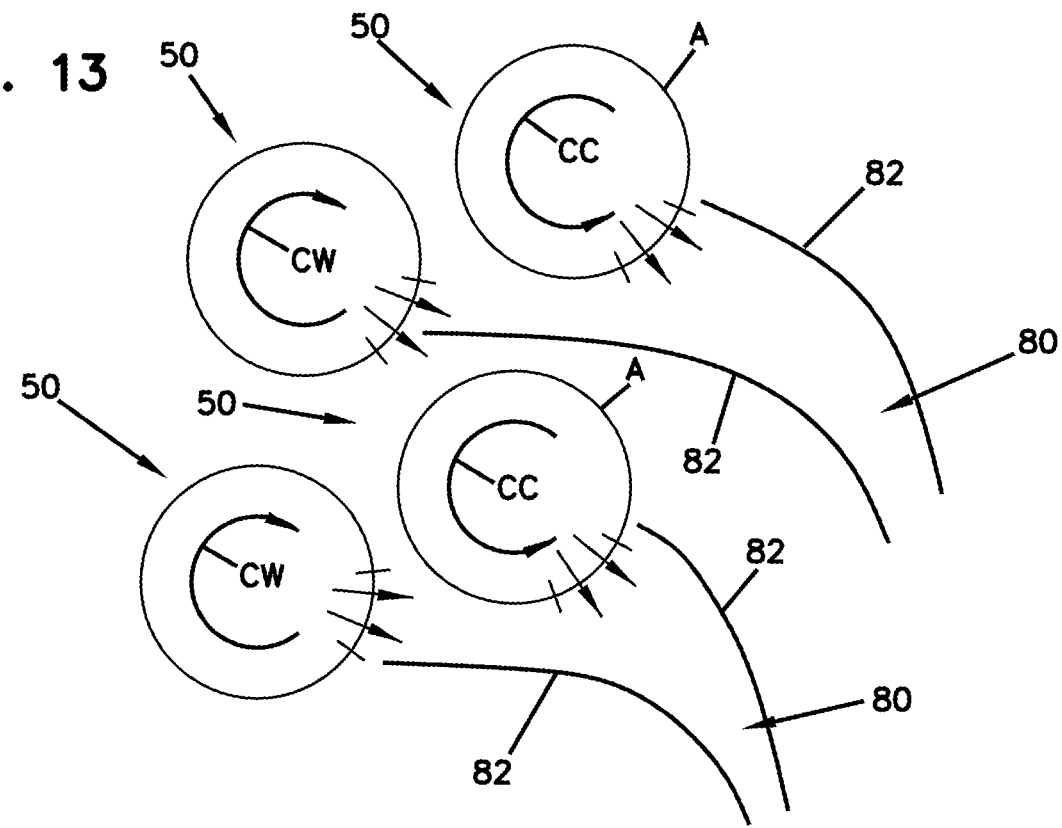
FIG. 13 is a schematic plan view of another embodiment, showing separator tubes and channel arrangements.

FIG. 13 is a schematic view of another embodiment. In the FIG. 13 embodiment, a cyclonic airflow is induced in a counterclockwise direction CC in tubes A, while a cyclonic airflow is induced in a clockwise direction CW in tubes B. The tubes 50 are ejecting dust (airflow and particulates) in the same general direction toward the same side of the side wall of the precleaner. Channel walls 82 are illustrated guiding the dust of each set of two tubes 50 (one tube A and one tube B) in toward the same side of the precleaner and into the channel arrangement 80 toward the dust outlet arrangement 42.

Figure 14:
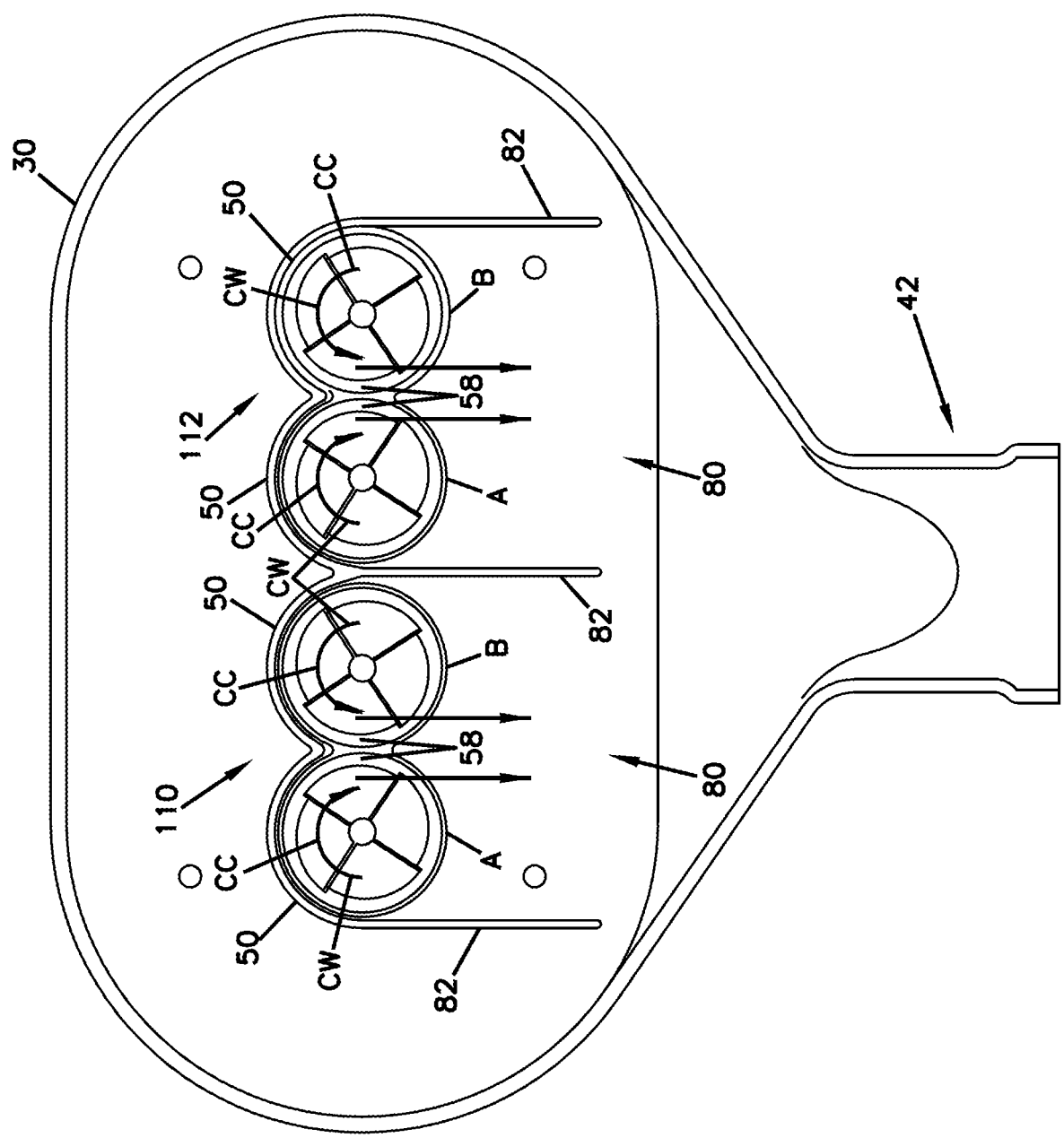
FIG. 14 is a schematic plan view from an upstream side of the precleaner, showing separator tubes and channel arrangements.

FIG. 14 is a schematic view of another embodiment. In the FIG. 14 embodiment, the housing 30 is shown enclosing a single row and four columns of separator tubes 50. There are two pairs of separator tubes 50, with the first pair at 110 and the second pair at 112. Within each pair 110, 112, the separator tubes 50 induce cyclonic airflow in opposite directions. The separator tubes 50 at A induce cyclonic airflow in a clockwise direction, while there adjacent separator tube 50 labeled at B induces cyclonic airflow in a counterclockwise direction. Many variations are possible, including the number of rows and columns of separator tubes 50 and the direction of cyclonic airflow.

Still in reference to FIG. 14, the separator tubes 50 at A and B in the first pair 110 have particulate outlets 58 adjacent to each other. Similarly, the separator tubes 50 at A and B in the second pair 112 have particulate outlets 58 adjacent to each other. Each pair 110, 112 has a channel arrangement 80 in airflow communication with the particulate outlets 58 to channel airflow and particulates from the particulate outlets 58 toward the dust outlet arrangement 42.

In the embodiment of FIG. 14, the channel arrangements 80 include a channel wall 82 enclosing each pair 110, 112. In this embodiment, the first pair 110 and second pair 112 share a common channel wall 82 therebetween, but in other embodiments, each pair 110, 112 could each have two separate channel walls 82. In FIG. 14, the first pair 110 has channel wall 82 adjacent to the separator tube A on a side opposite of the particulate outlet 58. There is also a channel wall 82 next to separator tube B and opposite of the particulate outlet 58. The second pair 112 has a similar arrangement as the first pair 110.

Figure 15:
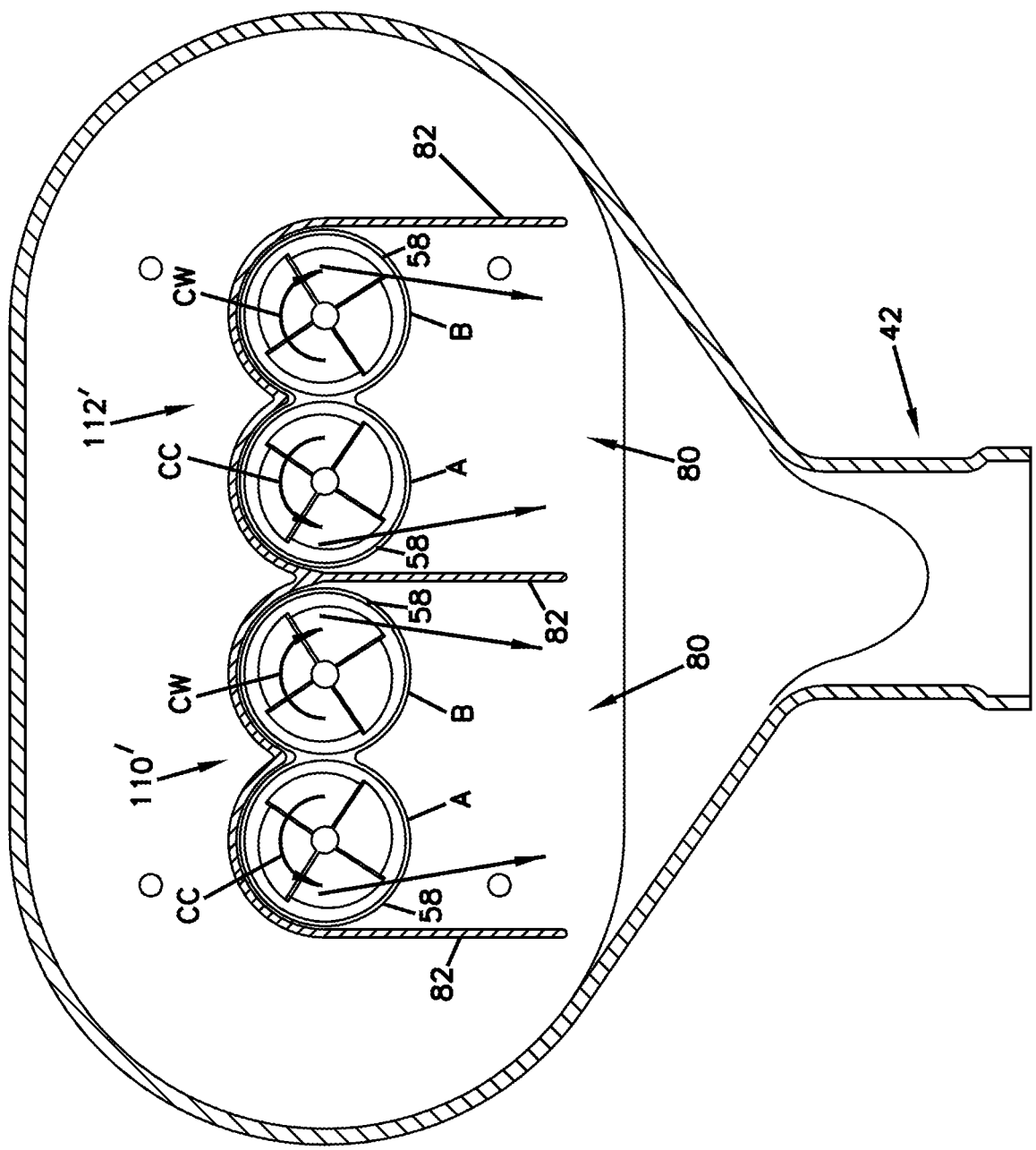
FIG. 15 is a schematic plan view of another embodiment, similar to the embodiment of FIG. 14, but showing the direction of the cyclonic airflow different from FIG. 14.

FIG. 15 is a variation on the embodiment of FIG. 14. In this embodiment, the separator tubes 58 labeled at A induce cyclonic airflow in a counterclockwise direction, while the separator tubes 50 at letter B induce cyclonic airflow in a clockwise direction. The particulate outlet 58 in each pair 110', 112' are now on opposite sides of the separator tubes 50 for each pair, as contrasted with the FIG. 14 embodiment. In the FIG. 15 embodiment, the channel walls 82 are adjacent to the particulate outlets 58.

Figure 16:
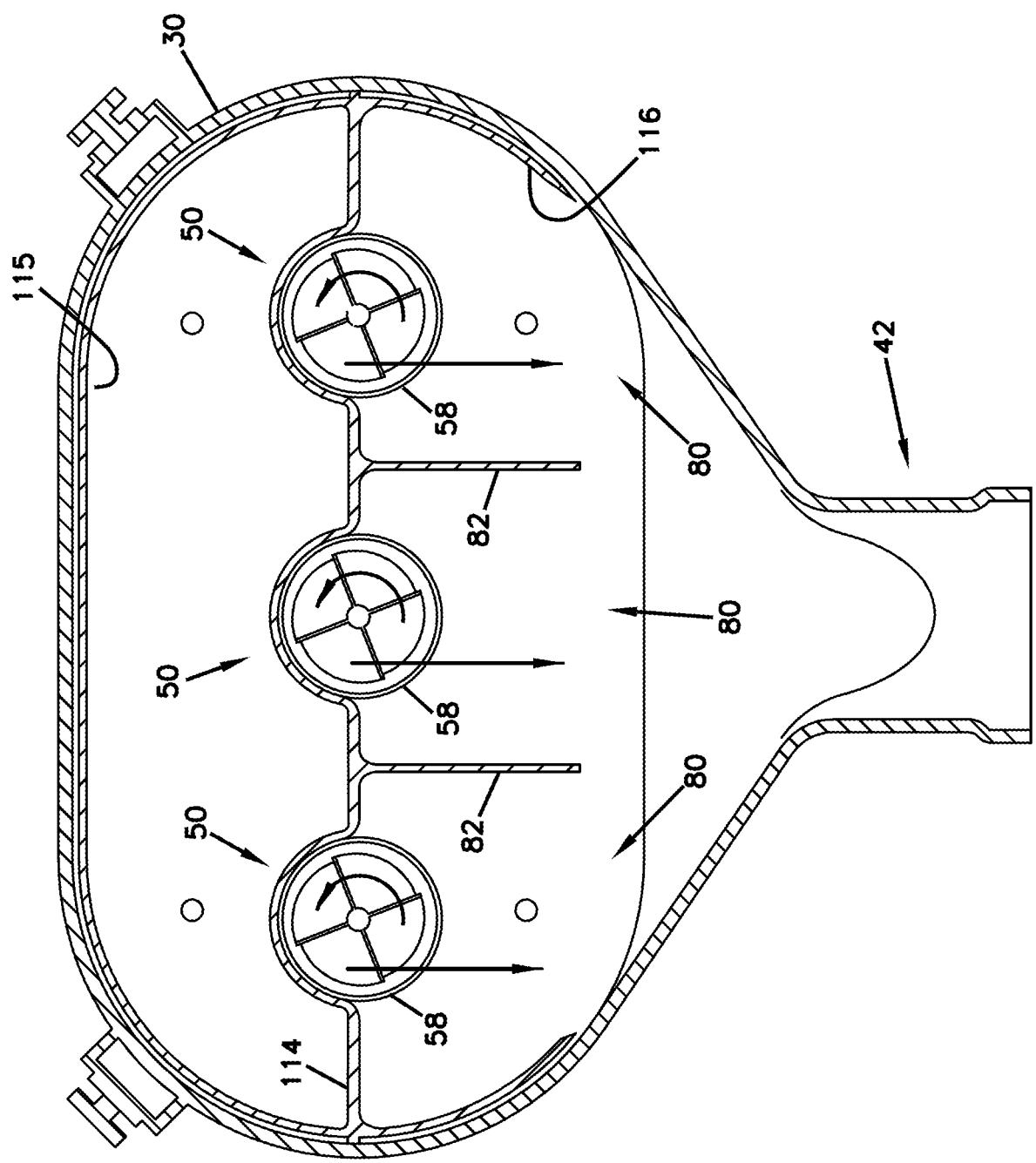
FIG. 16 is a schematic plan view from an upstream side of the precleaner of another embodiment, showing separator tubes and channel arrangements.

FIG. 16 is another embodiment. In the FIG. 16 embodiment, there is an internal wall 114 that divides the housing 30 into a first chamber 115 and a second chamber 116. This embodiment illustrates a single row and three columns of separator tubes 50. In other embodiments, there can be more than one row and more or fewer columns. The separator tubes 50, in this embodiment, each induce a cyclonic airflow in a same direction, and in the example shown here, in a counterclockwise direction. In other embodiments, the direction could be clockwise, or it could be different between each of the separator tubes 50. Channel walls 82 extend from the internal wall 114 to provide channel arrangements for directing airflow and particulates from each of the separator tubes 50. In the example shown, the channel walls 82 are perpendicular from the internal wall 114, but many variations are possible. The separator tubes 50 are spaced well apart from each other.

Figure 17:
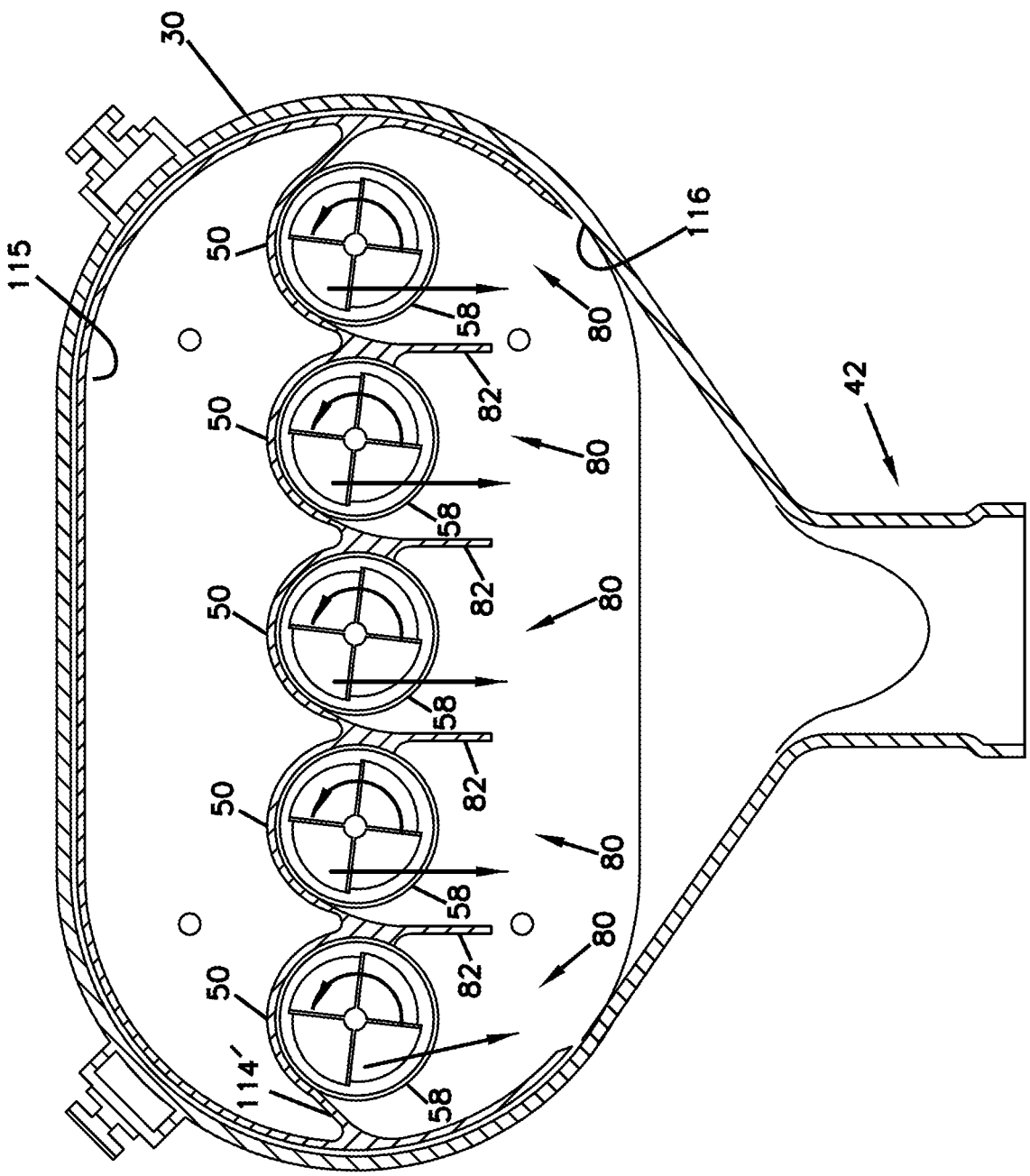
FIG. 17 is a schematic plan view of another embodiment, similar to FIG. 16, and showing additional separator tubes.

Another embodiment is illustrated in FIG. 17. This embodiment is similar to the FIG. 16 embodiment in that there is an internal wall shown at 114' that divides the housing 30 into first and second chambers 115, 116. The internal wall 114' is angled relative to the side wall of the housing 30, in this embodiment. This embodiment has five separator tubes 50 in a single row, although there can be more rows or fewer columns. In this embodiment, the separator tubes 50 are adjacent to each other, with only enough space for a channel wall 82 to be therebetween. In FIG. 16, in contrast, the separator tubes 50 included ample spacing between each separator tube 50. In FIG. 17 each of the separator tubes 50 induce cyclonic airflow in a counterclockwise direction, but there can be variations, including at least some of the separator tubes 50 inducing cyclonic airflow in a clockwise direction.

Figure 18:
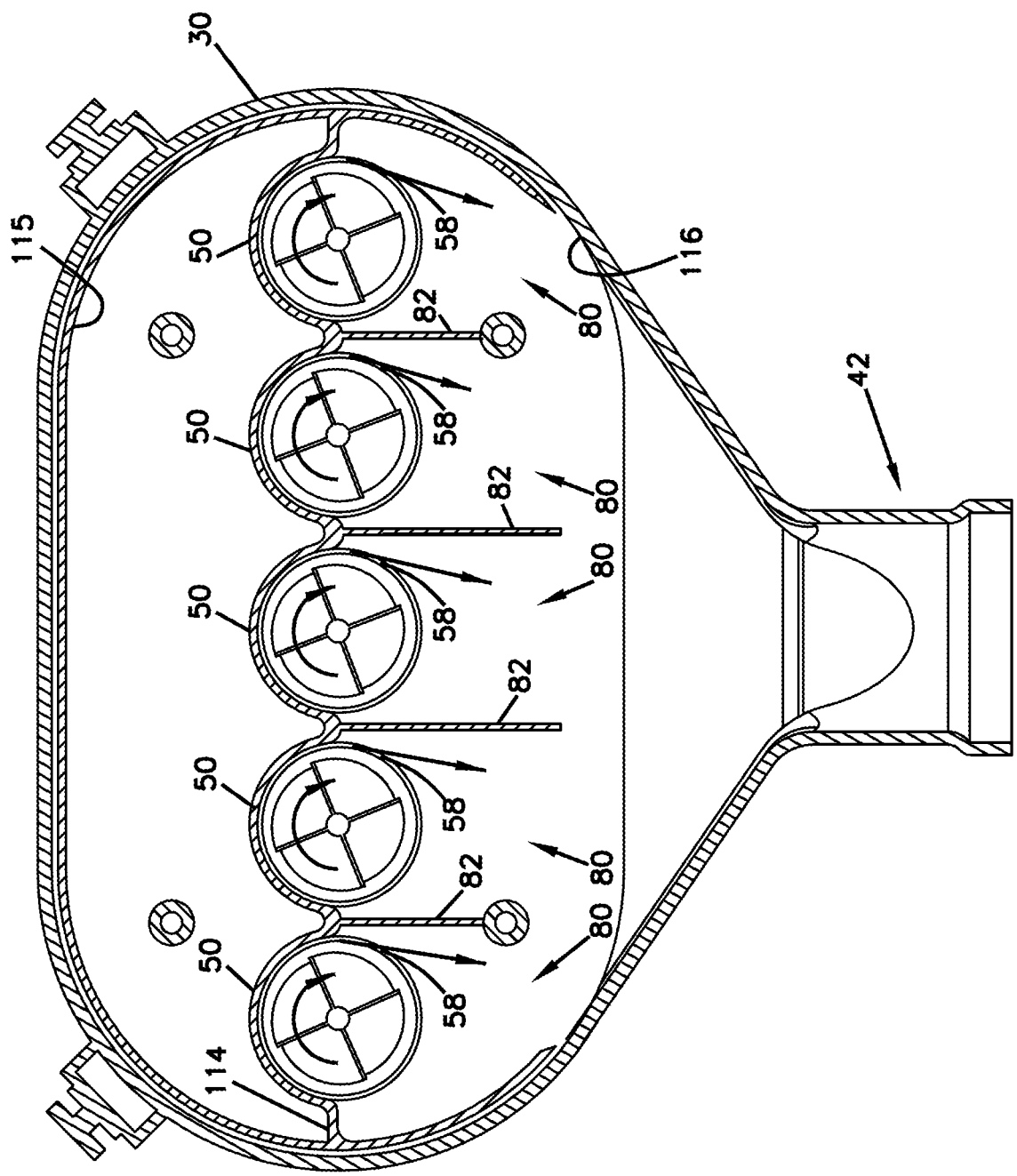
FIG. 18 is a schematic plan view of another embodiment, similar to the embodiment of FIG. 17, but showing a different direction of cyclonic airflow and a different arrangement of channel walls.

FIG. 18 is another embodiment, similar to the embodiment of FIG. 16. In this embodiment, the internal wall 114 separates the housing 30 between the first chamber 115 and second chamber 116. The separator tubes 50 are spaced immediately adjacent each other, similar to the embodiment of FIG. 17, but in this embodiment, each of the separator tubes 50 induce cyclonic airflow in a clockwise direction. The channel walls 82 separate the separator tubes 50 from the adjacent one.

Figure 19:
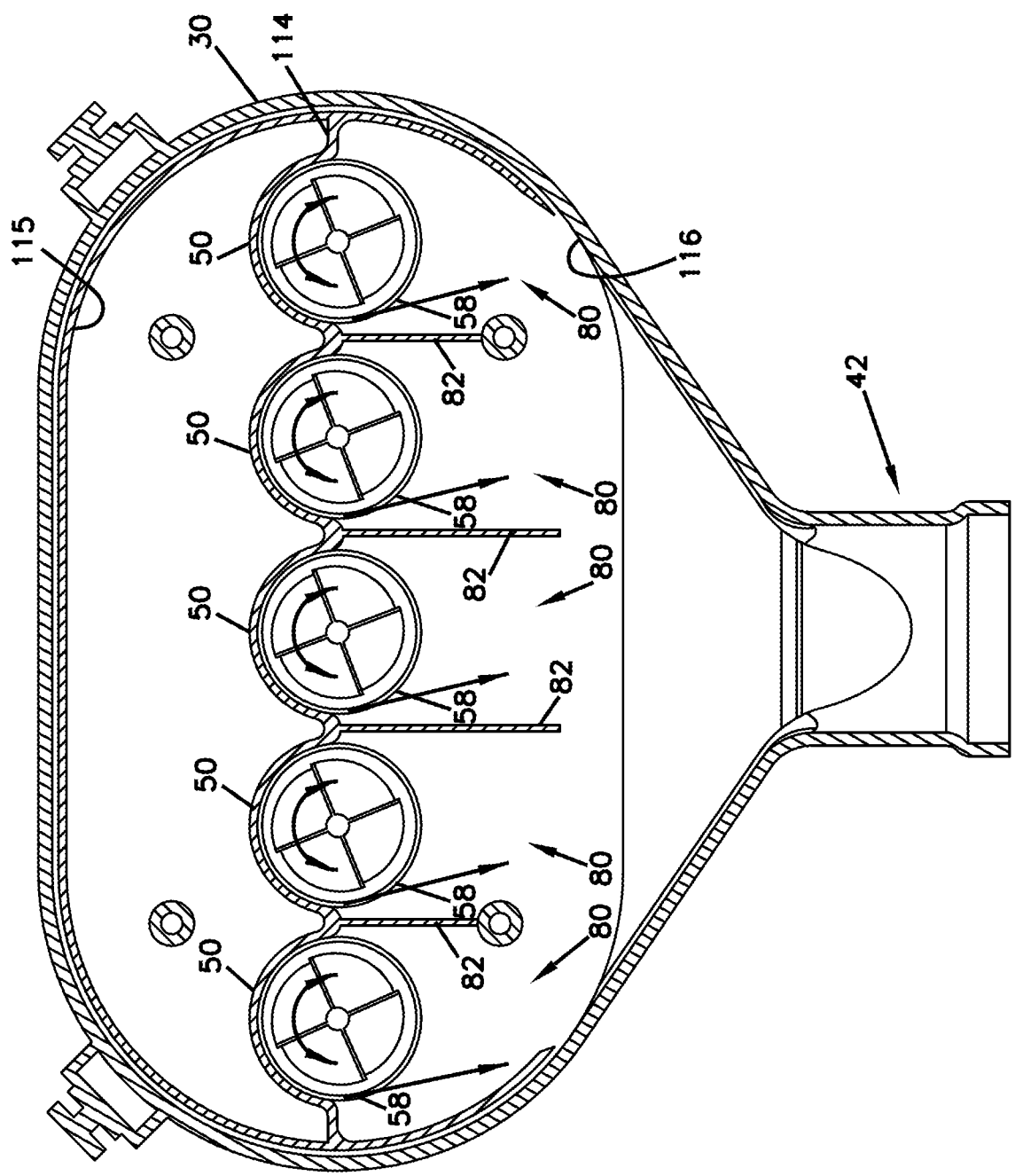
FIG. 19 is a schematic plan view of another embodiment, similar to the embodiment of FIG. 18, but showing a different direction of cyclonic airflow.

The embodiment of FIG. 19 is another variation. In FIG. 19, the structure is the same as FIG. 18, except that the direction of cyclonic airflow for the separator tubes 50 is counterclockwise, rather than clockwise as shown in FIG. 18. Otherwise, the other structure is the same as FIG. 18.

Figure 20:
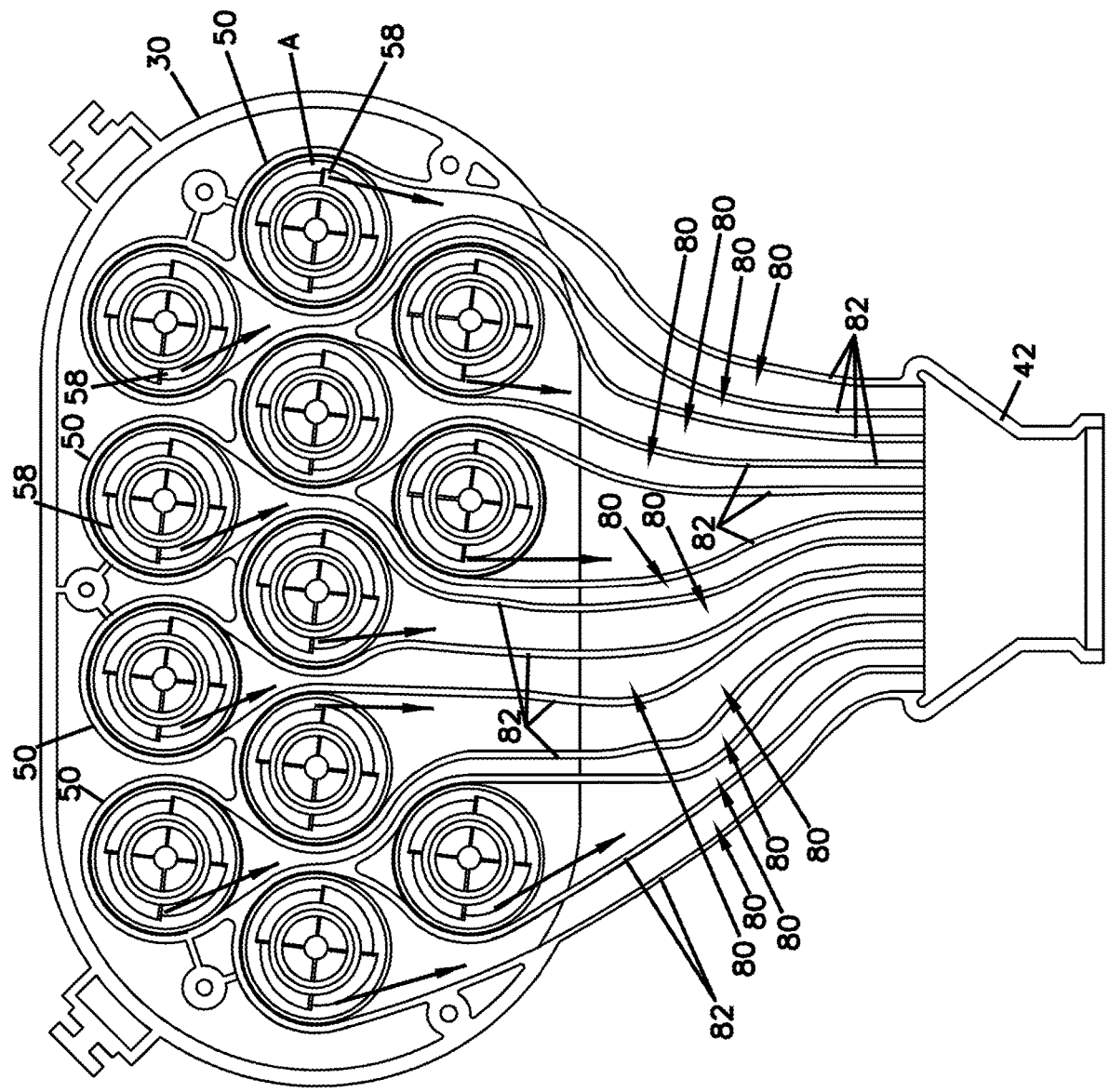
FIG. 20 is a schematic plan view from an upstream side of a precleaner showing another embodiment, with separator tubes and channel arrangements.
Figure 21:
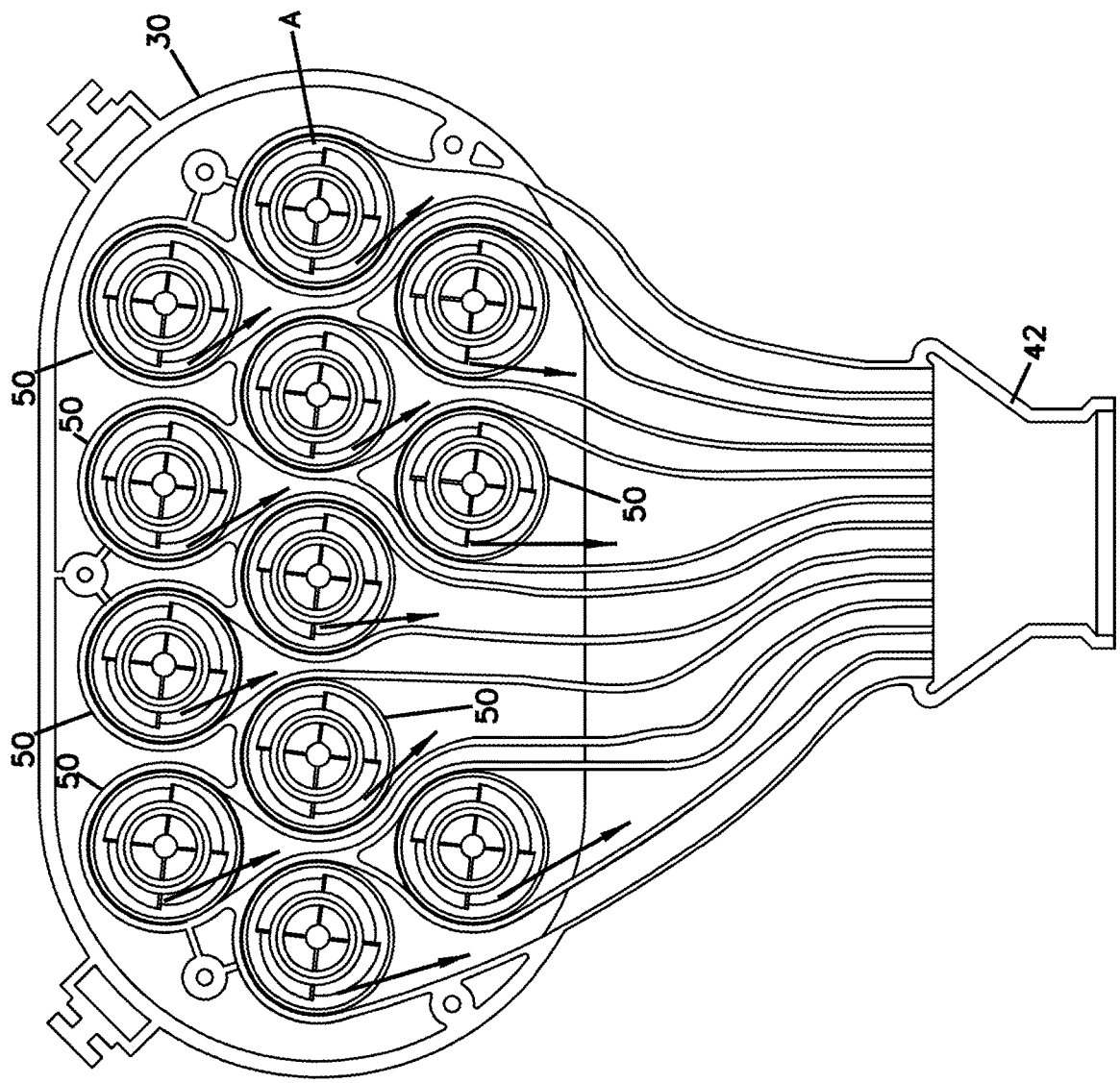
FIG. 21 is a schematic plan view of another embodiment, similar to the embodiment of FIG. 20, but showing a variation in the direction of cyclonic airflow for at least one of the separator tubes.

FIG. 20 is another embodiment. In FIG. 20, there are three rows of separator tubes 50. In other embodiments, there can be more or fewer rows. There is also a plurality of columns of separator tubes 50, although the separator tubes 50 in each column are not aligned in a straight column. Rather, the separator tubes 50 are aligned to be between two adjacent tubes in a row either above or below it. Each of the separator tubes 50 has channel arrangements 80 in airflow communication with the particulate outlets 58 to channel airflow and particulates from the particulate outlets 58 toward the dust outlet arrangement 42. In this embodiment, all of the separator tubes 50 induce cyclonic airflow in a same direction, with the exception of one of the separator tubes 50 shown at A. The separator tube at A induces cyclonic airflow in a clockwise direction, whereas all of the other separator tubes 50 induce cyclonic airflow in a counter clockwise direction. The channel arrangements 80 are defined by channel walls 82, which lead from each particular outlet 58 to the dust outlet arrangement 42. Many of the channel walls 82 are common between adjacent separator tubes 50. The embodiment of FIG. 21 is the same as the embodiment as FIG. 20 with the exception of separator tube 50 shown at A. In this embodiment, all of the separator tubes 50 induce cyclonic airflow in the same direction, including the separator tube 50 shown at A. In this embodiment, all induce a cyclonic airflow in a counterclockwise direction. It should be understood that in other embodiments, the separator tubes 50 can all be in a clockwise direction; or a plurality of the separator tubes 50 can be in one direction while the other plurality can be in another direction.

Many different embodiments can be made. For example, the housing 24 can be in two halves or pieces and the separator tubes 50 and channel walls 82/channel arrangements 80 can be present on one or the other side of the housing 24, or on the same side of the housing 24.

D. Example Methods

A method of precleaning air can be practiced using the precleaner 24 as described herein. The method includes directing air into the upstream flow face 40 of the housing 30. The air is then directed into a plurality of separator tubes 50 in the interior volume of the housing 30. The separator tubes have vane arrangements 54 to induce cyclonic air within the tubes 50 and cause particulates to exit the tubes 50 through particulate outlets 58 in the tubes 50. The method includes directing particulates from the particulate outlets 58 into channel arrangements 80 and toward a dust outlet arrangement 42 in the housing 30. From there, the precleaned air will exit through the exit end 74 of the separator tubes 50 and be drawn into the air filter arrangement 26, where it will be further filtered before being drawn into the engine 12.

The above represents example principles. Many embodiments can be made using these principles.

What is claimed is:

1. A precleaner comprising:
   (a) a housing having a surrounding wall, an interior volume, an upstream flow face, and a dust outlet arrangement;
   (b) a plurality of at least two separator tubes in the interior volume; each separator tube having a vane arrangement for inducing cyclonic air flow within the tube flowing from the upstream flow face; a pre-cleaned air outlet; and a particulate outlet; and
   (c) one or more channel arrangements in air flow communication with at least some of the particulate outlets to channel air flow and particulates from the particulate outlets toward the dust outlet arrangement;
      wherein one or more of the channel arrangements includes any of: at least one channel wall; a pair of channel walls; or more than a pair of channel walls shaped to channel air flow and particulates from the particulate outlets toward the dust outlet arrangement;
      at least a first separator tube has a first channel arrangement in air flow communication with the particulate outlet of the first separator tube, the first channel arrangement comprising at least one channel wall; and
      one or more of the channel walls defines an inlet gap therebetween and proximal to a respective separator tube, and an outlet gap therebetween and distal from a respective separator tube; the outlet gap being smaller than the inlet gap; the outlet gap being no greater than 60% of the inlet gap.

2. The precleaner of claim 1 wherein the first channel arrangement comprises at least a pair of channel walls.

3. The precleaner of claim 1 wherein each separator tube includes:
   (a) an inlet tube with a first end at the upstream flow face and an opposite second end; the second end defining an open slot forming the particulate outlet;
   (b) the vane arrangement within the inlet tube constructed and arranged to cause cyclonic air flow therewithin; and
   (c) an outlet tube having an open entrance end and an opposite open exit end; the open entrance end of the outlet tube being within an interior of the inlet tube.

4. The precleaner of claim 3 wherein the open slot is between channel walls of one or more of the channel arrangements.

5. The precleaner of claim 1 wherein the outlet gap is no greater than 50% of an outer diameter of the separator tubes.

6. The precleaner of claim 1 wherein the outlet gap is 4-11 mm.

7. The precleaner of claim 1 wherein at least one of the channel walls includes:
   (a) a first wall section proximal to a respective separator tube; and
   (b) a second wall section angled at a non-zero angle relative to the first wall section.

8. The precleaner of claim 7 wherein the first wall section is angled between 20-60 degrees relative to a longitudinal plane extending perpendicular to a top and bottom of the housing, as the first wall section extends away from and toward the dust outlet arrangement of the housing.

9. The precleaner of claim 7 wherein the second wall section is angled about 100-160° degrees relative to the first wall section, as the second wall section extends away from the first wall section and toward the dust outlet arrangement of the housing.

10. The precleaner of claim 7 wherein the second wall section is angled about 110-150° degrees relative to the first wall section, as the second wall section extends away from the first wall section and toward the dust outlet arrangement of the housing.

11. The precleaner of claim 7 wherein the second wall section is spaced laterally a first distance from a center of a respective separator tube, the first distance being greater than an outer diameter of the separator tube.

12. The precleaner of claim 1 wherein:
   (a) the plurality of separator tubes includes at least two columns and two rows of separator tubes;
   (b) each pair of channel walls define an inlet gap therebetween and proximal to a respective separator tube, and outlet gap therebetween and distal from a respective separator tube; the outlet gap being smaller than the inlet gap;
   (c) a smallest lateral distance between the second wall section and a sidewall of the housing is:
(a width of the outlet gap X (a total number of outlet gaps in a single column−1))/2.

13. The precleaner of claim 1 wherein the plurality of separator tubes includes at least two columns and one row of separator tubes.

14. The precleaner of claim 1 wherein the plurality of separator tubes includes at least two columns and two or more rows of separator tubes.

15. The precleaner of claim 1 wherein the dust outlet arrangement includes first and second spaced dust evacuation valves.

16. The precleaner of claim 1 wherein:
   (a) the plurality of separator tubes includes a first column of a plurality of separator tubes and a second column of a plurality of separator tubes;
   (b) the first column of separator tubes inducing cyclonic air flow in one of a clockwise or counterclockwise direction; and
   (c) the second column of separator tubes inducing cyclonic air flow in the other of clockwise or counterclockwise direction.

17. The precleaner of claim 16 wherein:
   (a) the dust outlet arrangement includes a first dust evacuation valve in air flow communication with channel arrangements corresponding to the first column of separator tubes; and
   (b) the dust outlet arrangement includes a second dust evacuation valve in air flow communication with channel arrangements corresponding to the second column of separator tubes.

18. The precleaner of claim 1 wherein:
(a) the plurality of separator tubes includes at least a first separator tube and a second separator tube aligned in a row;
(b) the first separator tube inducing cyclonic air flow in one of a clockwise or counterclockwise direction;
(c) the second separator tube inducing cyclonic air flow in the other of clockwise or counterclockwise direction; and
(d) the one or more channel arrangements includes channel arrangements in air flow communication with the particulate outlets of the first separator tube and second separator tube to eject air flow and particulates in a same direction and toward the dust outlet arrangement.

19. An air cleaner system comprising:
(a) a precleaner according to claim 1; and
(b) an air filter arrangement downstream of and in airflow communication with the precleaner, the air filter arrangement taking in air from the pre-cleaned air outlets of the separator tubes.

20. A method of precleaning air, the method comprising:
(a) directing air into an upstream flow face of a housing having a surrounding wall, an interior volume, and a dust outlet arrangement;
(b) directing the air into a plurality of separator tubes in the interior volume having vane arrangements to induce cyclonic air within the tubes and cause particulates to exit the tubes through particulate outlets in the tubes; and
(c) directing particulates from the particulate outlets into channel arrangements and toward the dust outlet arrangement;
  wherein at least a first separator tube has a first channel arrangement in air flow communication with the particulate outlet of the first separator tube, the first channel arrangement comprising at least one channel wall; and one or more of the channel walls defines an inlet gap therebetween and proximal to a respective separator tube and an outlet gap therebetween and distal from a respective separator tube; the outlet gap being smaller than the inlet gap; the outlet gap being no greater than 60% of the inlet gap; and
wherein each particulate outlet is between two channel walls.

* * * * *